(12) United States Patent
Fukuda et al.

(10) Patent No.: US 8,340,208 B2
(45) Date of Patent: Dec. 25, 2012

(54) INFORMATION PROCESSING DEVICE AND SIGNAL PROCESSING METHOD

(75) Inventors: Kunio Fukuda, Tokyo (JP); Takehiro Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 609 days.

(21) Appl. No.: 12/487,892

(22) Filed: Jun. 19, 2009

(65) Prior Publication Data

US 2010/0027708 A1    Feb. 4, 2010

(30) Foreign Application Priority Data

Jul. 31, 2008   (JP) ................... 2008-198396

(51) Int. Cl.
*H04L 25/34* (2006.01)

(52) U.S. Cl. ........ 375/286; 375/264; 375/333; 375/354; 375/361; 375/349; 375/337; 375/228; 341/56; 341/73; 341/68; 341/69; 341/70; 708/201

(58) Field of Classification Search .............. 375/286, 375/288, 257, 354, 293, 294, 333, 264, 361, 375/349, 337, 282; 329/347, 363; 341/56, 341/68–70, 73; 708/201
See application file for complete search history.

(56) References Cited

U.S. PATENT DOCUMENTS 4,584,690 A * 4/1986 Cafiero et al. ............... 375/290
5,075,879 A * 12/1991 Anderson .................... 708/201
7,221,711 B2 * 5/2007 Woodworth ................. 375/246

FOREIGN PATENT DOCUMENTS

JP   3-109843   5/1991

OTHER PUBLICATIONS

U.S. Appl. No. 12/483,425, filed Jun. 12, 2009, Sugita, et al.

* cited by examiner

*Primary Examiner* — David Ometz
*Assistant Examiner* — Rahel Guarino
(74) *Attorney, Agent, or Firm* — Oblon, Spivak, McClelland, Maier & Neustadt, L.L.P.

(57) ABSTRACT

An information processing device is provided that includes a signal receiving portion, an absolute value conversion portion, and an input data decoding portion. The signal receiving portion receives a signal that is encoded such that mutually distinct first and second bit values are respectively expressed by pluralities of mutually distinct first amplitude values and second amplitude values, the first and second bit values also being encoded such that the same amplitude value does not occur twice in succession and such that the polarities of the amplitude values are inverted with each cycle. The absolute value conversion portion converts into absolute values the amplitude values of the signal that has been received by the signal receiving portion. The input data decoding portion decodes the first and second bit values based on the amplitude values in the signal that have been converted into absolute values by the absolute value conversion portion.

7 Claims, 20 Drawing Sheets

EXAMPLE OF CONFIGURATION OF DECODER 334 ACCORDING TO THE PRESENT EMBODIMENT

EXAMPLE OF CIRCUIT CONFIGURATION OF CLOCK DETECTION PORTION 332

FIG. 14

DETERMINATION TABLE FOR DATA DETERMINATION (STORAGE PORTION 364)

| COMPARATOR 354 | COMPARATOR 356 | COMPARATOR 358 | COMPARATOR 360 | OUTPUT DATA |
|---|---|---|---|---|
| 1 | 1 | 1 | 1 | 1 |
| 0 | 1 | 1 | 1 | 0 |
| 0 | 0 | 1 | 1 | 1 |
| 0 | 0 | 0 | 1 | 0 |
| 0 | 0 | 0 | 0 | 1 |

EXAMPLE OF CONFIGURATION OF DECODER 334 ACCORDING TO THE PRESENT EMBODIMENT

EXAMPLE OF CONFIGURATIONS OF
ABSOLUTE VALUE CIRCUITS 402, 408
(EXAMPLE OF DOUBLE BALANCED MIXER)

EXAMPLE OF CONFIGURATION OF MEAN VALUE CIRCUIT 410

FREQUENCY SPECTRUM SHIFT IN DECODER 334'

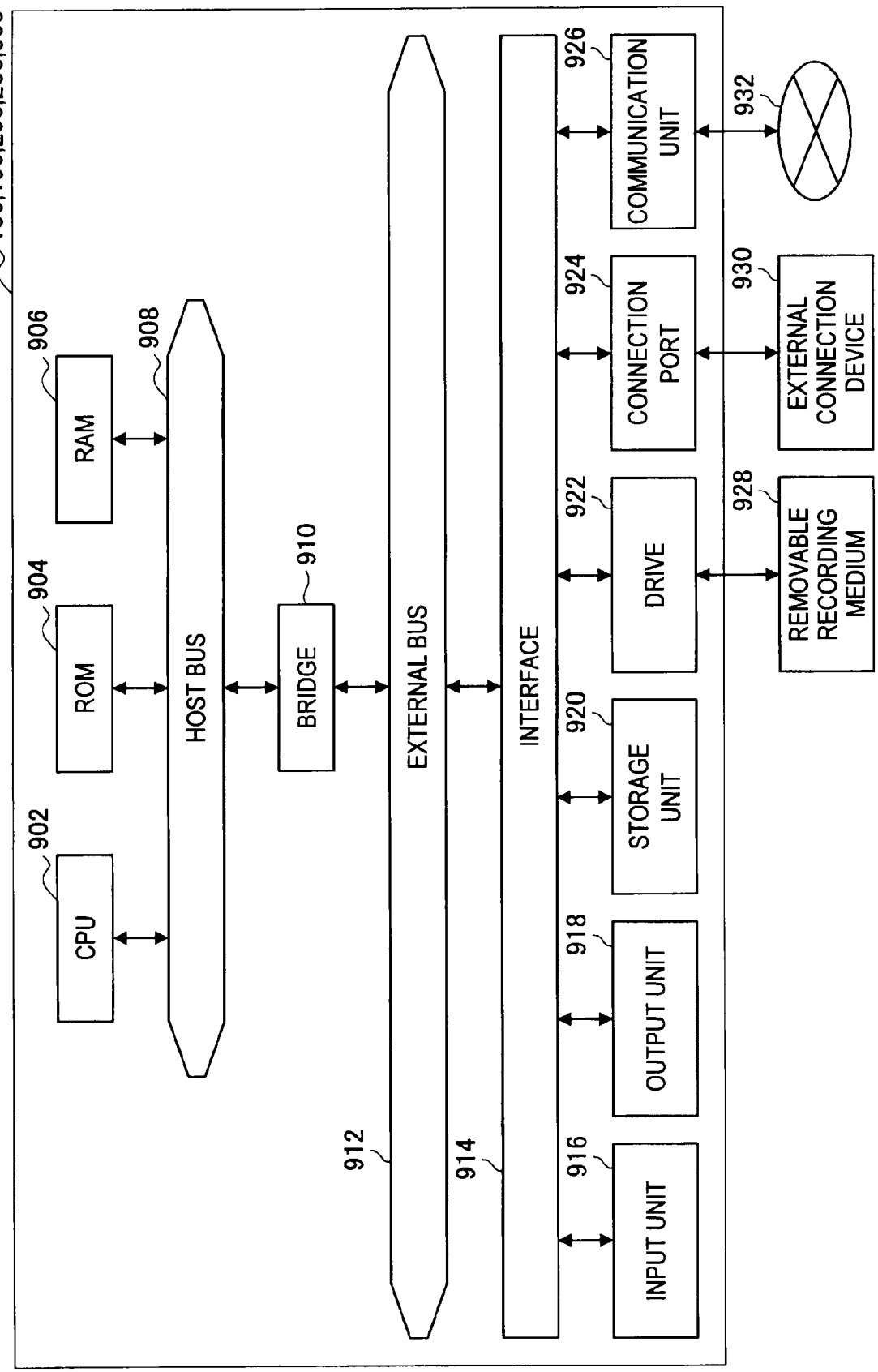

INFORMATION PROCESSING DEVICE AND SIGNAL PROCESSING METHOD

BACKGROUND OF THE INVENTION

1. Field of the Invention

The present invention relates to an information processing device and a signal processing method.

2. Description of the Related Art

Most mobile terminals that are typified by mobile telephones and the like use a movable member for a connecting portion between an operation portion that a user operates and a display portion on which information is displayed. Typical examples include the opening and closing structures and the like of folding-type mobile telephones. Furthermore, in addition to telephone functions and e-mail functions, recent mobile telephones are provided with functions for watching and listening to videos, functions for taking photographs, and the like that require the connecting portion described above to be moved in complicated ways according to the user's purpose. For example, in a case where the mobile telephone is used to watch and listen to a video, it is conceivable that the user would want to turn the display portion toward himself and to stow the operation portion, which is not necessary for watching and listening. Thus a structure is required by which the position and orientation of the display portion can be easily changed according to the purpose, such as when the mobile telephone is used as a telephone, when it is used as a digital camera, when it is used as a television receiver, and the like.

However, a large number of signal lines and electric power lines pass through the connecting portion between the operation portion and the display portion. For example, dozens of wires are connected in parallel in the display portion (refer to FIG. 1). Therefore, when a movable member that can be moved in a complicated manner like that described above is used for the connecting portion, the reliability and the like of the wiring diminishes considerably. For this reason, the technology has been shifting from a parallel transmission method to a serial transmission method (refer to FIG. 2) in order to decrease the number of signal lines in the connecting portion. Of course, technological shifts for the same kinds of reasons are not limited to the realm of mobile telephones, but are also occurring in a wide variety of electronic devices for which complicated wiring is required. Note that an additional reason for the shift to serial transmission is to reduce electromagnetic interference (EMI).

In a serial transmission method like that described above, the transmission data is transmitted after being encoded by a specified method. The encoding method that is used may be, for example, the non-return to zero (NRZ) encoding method, the Manchester encoding method, the Alternate Mark Inversion (AMI) encoding method, or the like. For example, in Japanese Patent Application Publication No. JP-A-3-109843, a data transmission technology is disclosed that uses the AMI code, which is a representative example of a bipolar code. In the same document, another technology is disclosed by which a data clock is expressed by an intermediate value of the signal level and transmitted, and the data clock is then regenerated on the receiving side based on the signal level.

SUMMARY OF THE INVENTION

Among the encoding methods that are described above, the NRZ encoding method produces a signal that contains a direct current component. It is therefore difficult to transmit the NRZ-encoded signal together with a direct current component such as the power supply or the like. On the other hand, the signals that are produced by the Manchester encoding method and the AMI encoding method do not contain a direct current component. It is therefore possible to transmit the signals together with a direct current component such as the power supply or the like. However, the Manchester encoding method and the AMI encoding method make it necessary to have a phase-locked loop (PLL) circuit on the receiving side in order to regenerate the data clock of the signal. However, providing the PLL circuit on the receiving side increases the amount of electric current that is consumed. Moreover, with the Manchester encoding method, the data is transmitted by raising and lowering the amplitude, so it is necessary to transmit a clock that is two times the data rate. The resulting high clock operation increases the amount of electric current that is consumed.

A technology has been developed that addresses these problems by generating and transmitting a code that does not contain a direct current component and does not require a PLL circuit when the clock is regenerated. The technology takes input data that contains mutually different first and second bit values, then encodes and transmits the data by expressing the first bit value in the form of a plurality of first amplitude values and expressing the second bit value in the form of second amplitude values that differ from the first amplitude values, such that the same amplitude value does not occur twice in succession and the polarity of the amplitude values is inverted with each cycle. However, in order to determine the first and second bit values in a transmission signal that has been encoded by the technology, it is necessary to repeat threshold value determination processing any number of times.

Accordingly, the present invention addresses the problems that are described above and provides an information processing device and a signal processing method that are new and improved and that make it possible to reduce the number of times that the threshold value determination processing is performed when the bit values are decoded from the code that does not contain a direct current component and does not require a PLL circuit when the clock is regenerated.

In order to address the problems that are described above, according to an aspect of the present invention, an information processing device is provided that includes a signal receiving portion, an absolute value conversion portion, and an input data decoding portion. The signal receiving portion receives a signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle. The absolute value conversion portion converts into absolute values the amplitude values of the signal that has been received by the signal receiving portion. The input data decoding portion decodes the input data by determining the first and second bit values based on the amplitude values in the signal that have been converted into absolute values by the absolute value conversion portion.

The absolute value conversion portion may also include a first absolute value circuit, a direct current suppression circuit, a low-pass filter, and a second absolute value circuit. The first absolute value circuit may convert into absolute values the amplitude values of the signal that has been received by the signal receiving portion. The direct current suppression circuit may suppress a direct current component in a signal that has been output from the first absolute value circuit. The low-pass filter may suppress a high-frequency component in a signal that has been output from the direct current suppression circuit. The second absolute value circuit may convert amplitude values of a signal that has been output from the low-pass filter into absolute values.

The information processing device may also include a mean value computation portion that computes a mean amplitude value by computing the average of two amplitude values of a signal that is output from the second absolute value circuit. In this case, the input data decoding portion determines the first and second bit values by comparing the amplitude values of the signal that is output from the second absolute value circuit to the mean amplitude value that has been computed by the mean value computation portion.

The information processing device may also include a clock signal extraction portion that extracts a clock signal by detecting the polarity inversions in the signal that is received by the signal receiving portion. In this case, the first absolute value circuit converts the amplitude values in the signal into absolute values by synchronizing the signal that has been received by the signal receiving portion to the clock signal that has been extracted by the clock signal extraction portion, then multiplying the amplitude values in the signal by the amplitude values in the clock signal. Furthermore, the second absolute value circuit takes the signal that has been output from the low-pass filter and converts the amplitude values in the signal into absolute values by synchronizing the signal that has been output from the low-pass filter to the clock signal that has been extracted by the clock signal extraction portion, then multiplying the amplitude values in the signal by the amplitude values in the clock signal.

Each of the first and second absolute value circuits can be configured from a double balanced mixer that converts an input signal into absolute values by using the clock signal that has been extracted by the clock signal extraction portion.

Furthermore, in order to address the problems that are described above, according to another aspect of the present invention, a signal processing method is provided that includes a step of receiving a signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle. The signal processing method also includes a step of converting into absolute values the amplitude values of the received signal. The signal processing method also includes a step of decoding the input data by determining the first and second bit values based on the amplitude values in the signal that have been converted into absolute values.

In addition, in order to address the problems that are described above, according to another aspect of the present invention, a program can be provided that causes the functions of the information processing device that is described above to be implemented by a computer. A computer-readable storage medium in which the program is stored can also be provided.

According to the embodiments of the present invention that are described above, it is possible to reduce the number of times that the threshold value determination processing is performed when the bit values are decoded from the code that does not contain a direct current component and does not require a PLL circuit when the clock is regenerated. This in turn makes it possible to reduce the computing load that is involved in the processing that encodes the bit values. It also becomes possible to reduce the scale of the circuitry that is used for determining the threshold values.

BRIEF DESCRIPTION OF THE DRAWINGS

FIG. 14 is an explanatory figure that shows an example of a configuration of a determination table for data determination;

FIG. 20 is an explanatory figure that shows an example of a hardware configuration of an information processing device such as a mobile terminal or the like.

DETAILED DESCRIPTION OF THE PREFERRED EMBODIMENTS

Figure 1:
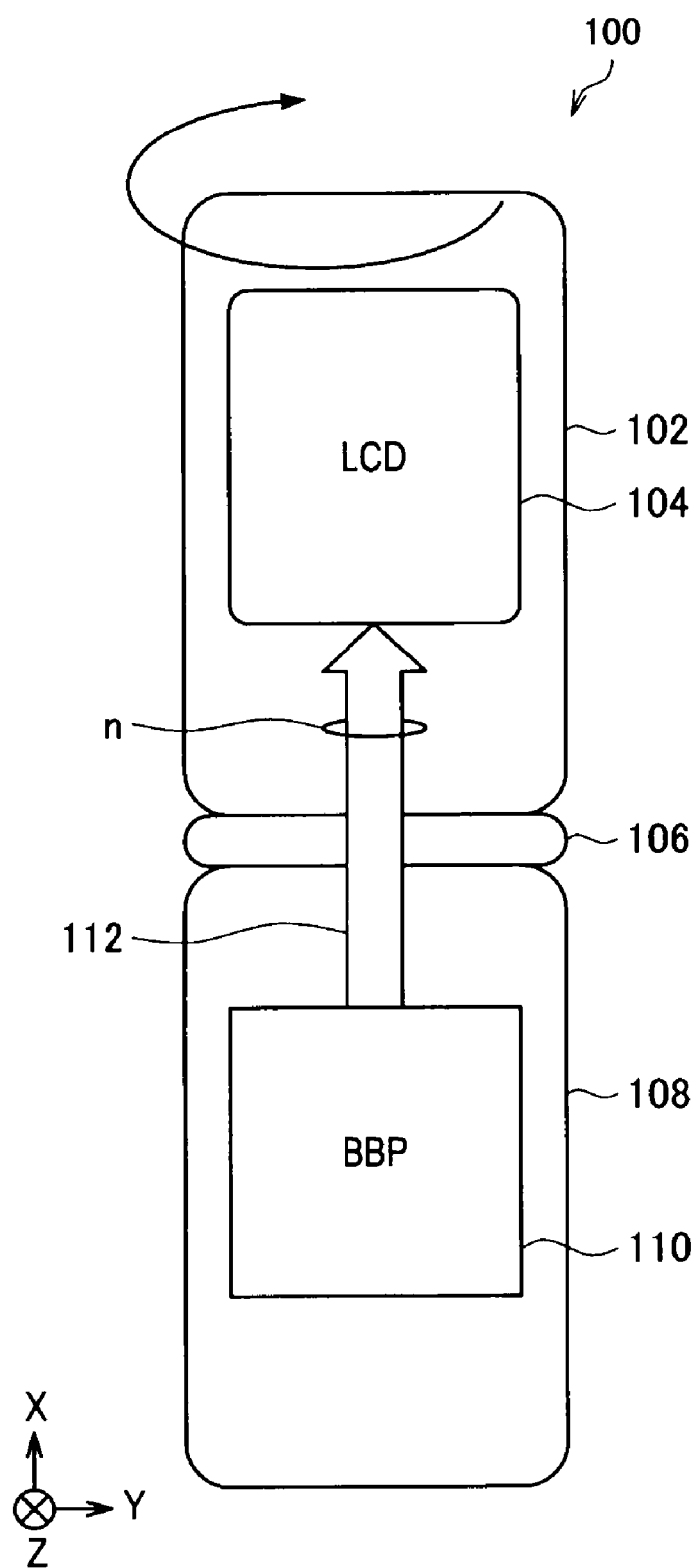
FIG. 1 is an explanatory figure that shows an example of a configuration of a mobile terminal.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Flow of Explanation

The flow of the explanation of the embodiments of the present invention that are hereinafter described will be briefly explained. First, the technical issues facing mobile telephones and the like that use a parallel transmission method will be briefly explained with reference to FIG. 1. Next, the issues facing signal transmission technologies that use a serial transmission method will be explained with reference to FIGS. 2 to 8. Next, a new signal transmission technology that has been conceived for the purpose of resolving the issues facing signal transmission technologies that use a serial transmission method will be explained with reference to FIGS. 9 to 11. The technical issues facing this sort of new signal transmission technology will also be explained.

The new signal transmission technology pertains to a method that transmits a signal using a code that does not contain a direct current component and does not require a PLL circuit when a clock is regenerated. An embodiment of the present invention concerns a technology that, in a case where this sort of code is used, improves the efficiency of decoding processing that extracts bit values from the signal. Accordingly, before this sort of improved technology is explained, decoding processing that is known to be used in the new signal transmission technology will be explained with reference to FIGS. 12 to 15.

In consideration of the technological features of the new signal transmission technology described above, a configuration of a decoder and a signal processing method according to an embodiment of the present invention will be explained with reference to FIG. 16. An example of a configuration of absolute value circuits that configure the decoder in the present embodiment will be explained with reference to FIG. 17. An example of a configuration of a mean value circuit that configures the decoder in the present embodiment will be explained with reference to FIG. 18. Spectrum shifts that are produced in the course of signal processing in the decoder in the present embodiment will be explained with reference to FIG. 19. Next, the technical concepts of the embodiment and the effects of applying those technical concepts will be briefly explained. Finally, an example of a hardware configuration of a terminal device that utilizes the technology according to the embodiment will be explained with reference to FIG. 20.

Summary of Issues

First, before the technology according to the embodiment of the present invention is explained in detail, the issues to be resolved by the embodiment will be briefly explained.

Parallel Transmission Method

First, an example of a configuration of a mobile terminal 100 that uses the parallel transmission method will be briefly explained with reference to FIG. 1. FIG. 1 is an explanatory figure that shows the example of the configuration of the mobile terminal 100 that uses the parallel transmission method. Note that in FIG. 1, a mobile telephone is schematically illustrated as an example of the mobile terminal 100. However, the scope of use of the technology according to the explanation that follows is not limited to a mobile telephone.

As shown in FIG. 1, the mobile terminal 100 is mainly configured from a display portion 102, a liquid crystal display (LCD) 104, a connecting portion 106, an operation portion 108, a base band processor (BBP) 110, and a parallel signal path 112. Note that in some cases, the display portion 102 is called a display side (D), and the operation portion 108 is called a main body side (M). Furthermore, in the explanation that follows, an example will be explained of a case in which a video signal is transmitted from the main body side to the display side. Of course, the technology that is described below is not limited to this example.

As shown in FIG. 1, the LCD 104 is provided in the display portion 102. A video signal that is transmitted through the parallel signal path 112 is displayed on the LCD 104. The connecting portion 106 is a member that connects the display portion 102 and the operation portion 108. The connecting member that forms the connecting portion 106 has a structure that can rotate the display portion 102 180 degrees within the Z-Y plane. The connecting member also has a structure that is formed such that the display portion 102 can be rotated within the X-Z plane such that the mobile terminal 100 can be folded up. Note that the connecting member may also have a structure that allows the display portion 102 to move freely in any direction.

The BBP 110 is a computational processing portion that provides the mobile terminal 100 with a communication control function and an application execution function. A parallel signal that is output from the BBP 110 is transmitted through the parallel signal path 112 to the LCD 104 of the display portion 102. The parallel signal path 112 is provided with a plurality of signal lines. In the case of a mobile telephone, for example, the number n of the signal lines is approximately fifty lines. The video signal transmission speed is approximately 130 Mbps in a case where the resolution of the LCD 104 is QVGA. The parallel signal path 112 is wired such that the lines pass through the connecting portion 106.

In other words, the plurality of signal lines that form the parallel signal path 112 are provided in the connecting portion 106. As mentioned in the Description of the Related Art section, if the range of movement of the connecting portion 106 is increased, the risk increases that the movement will inflict damage on the parallel signal path 112. This would result in impairment of the reliability of the parallel signal path 112. On the other hand, if the reliability of the parallel signal path 112 is maintained, the range of movement of the connecting portion 106 will be restricted. It is for this reason that the serial transmission method has come to be widely used in mobile telephones and the like in order to maintain the reliability of the parallel signal path 112 while also increasing the degree of freedom of the movable member that forms the connecting portion 106. The shift to the serial transmission method for the transmission path is also being promoted from the standpoint of EMI.

Serial Transmission Method

Figure 2:
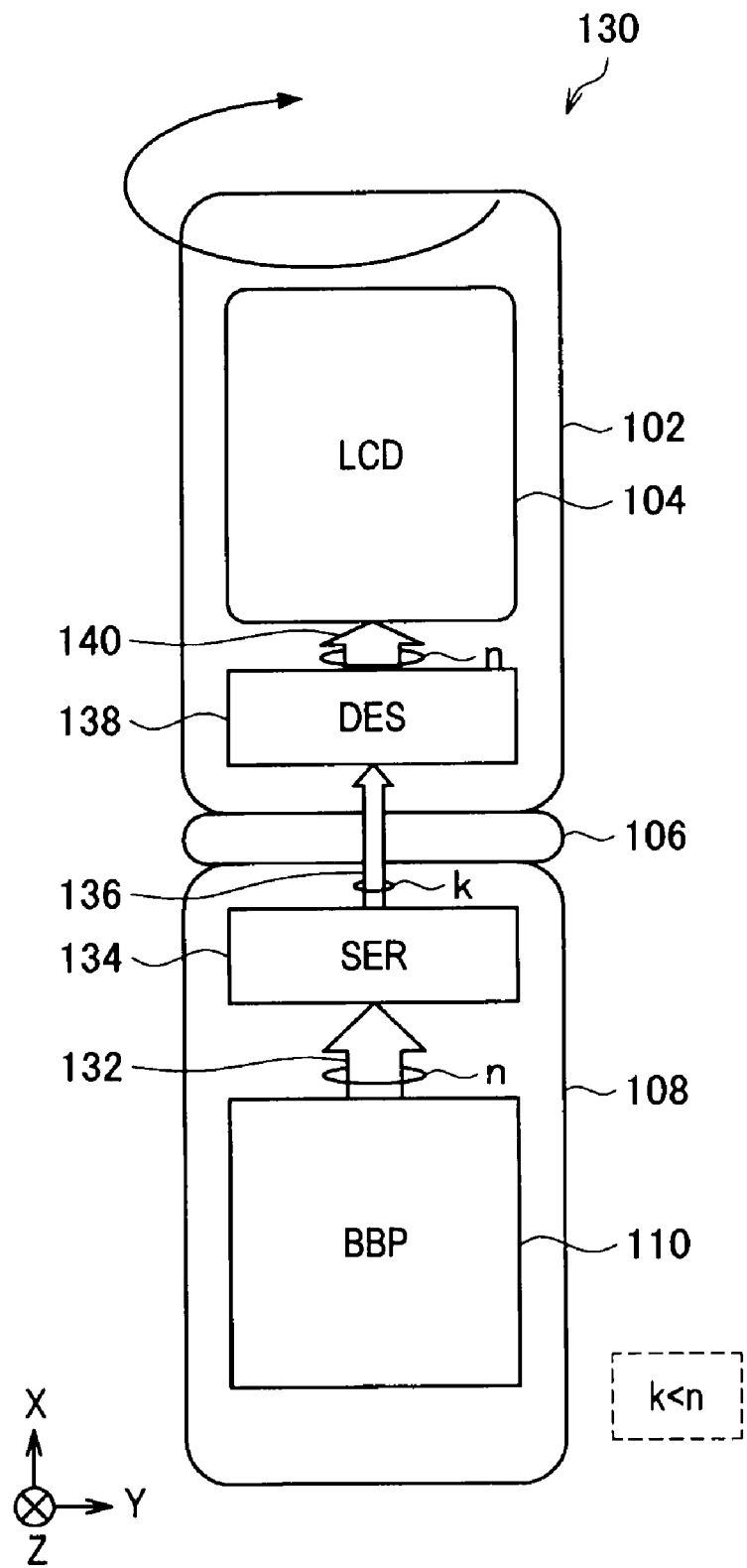
FIG. 2 is an explanatory figure that shows an example of a configuration of a mobile terminal.

Now an example of a configuration of a mobile terminal 130 that uses the serial transmission method will be briefly explained with reference to FIG. 2. FIG. 2 is an explanatory figure that shows the example of the configuration of the mobile terminal 130 that uses the serial transmission method. Note that in FIG. 2, a mobile telephone is schematically illustrated as an example of the mobile terminal 130. However, the scope of use of the technology according to the explanation that follows is not limited to a mobile telephone. Note also that configuring elements of the mobile terminal 130 that have substantially the same function as in the mobile terminal 100 that uses the parallel transmission method and is shown in FIG. 1 are denoted by the same reference numerals and detailed explanations will be omitted.

As shown in FIG. 2, the mobile terminal 130 is mainly configured from the display portion 102, the LCD 104, the connecting portion 106, the operation portion 108, the BBP 110, parallel signal paths 132, 140, a serializer 134, a serial signal path 136, and a deserializer 138.

Unlike the mobile terminal 100 that is described above, the mobile terminal 130 transmits the video signal by the serial transmission method through the serial signal path 136 that is wired through the connecting portion 106. Therefore, the serializer 134 is provided in the operation portion 108 to serialize the parallel signal that is output from the BBP 110. On the other end, the deserializer 138 is provided in the display portion 102 to parallelize the serial signal that is transmitted through the serial signal path 136.

The serializer 134 converts the parallel signal that is output from the BBP 110 and input through the parallel signal path 132 into a serial signal. The serial signal that has been converted by the serializer 134 is input to the deserializer 138 through the serial signal path 136. Next, the deserializer 138 restores the input serial signal to the original parallel signal and inputs it to the LCD 104 through the parallel signal path 140.

In the serial signal path 136, a data signal that is encoded by the NRZ encoding method, for example, may be transmitted on its own, and alternatively, the data signal and a clock signal may be transmitted together. The number k of the lines in the serial signal path 136 is significantly less than the number n of the lines in the parallel signal path 112 in the mobile terminal 100 in FIG. 1 ($1 \leq k \ll n$). For example, the number k of the lines can be reduced to only a few lines. Therefore, the degree of freedom of the connecting portion 106 through which the serial signal path 136 passes can be said to be very much greater than that of the connecting portion 106 through which the parallel signal path 112 passes. At the same time, it can also be said that the reliability of the serial signal path 136 is high. Note that ordinarily, a differential signal such as a low voltage differential signal (LVDS) or the like is used for the serial signal that flows through the serial signal path 136.

Functional Configuration

Figure 3:
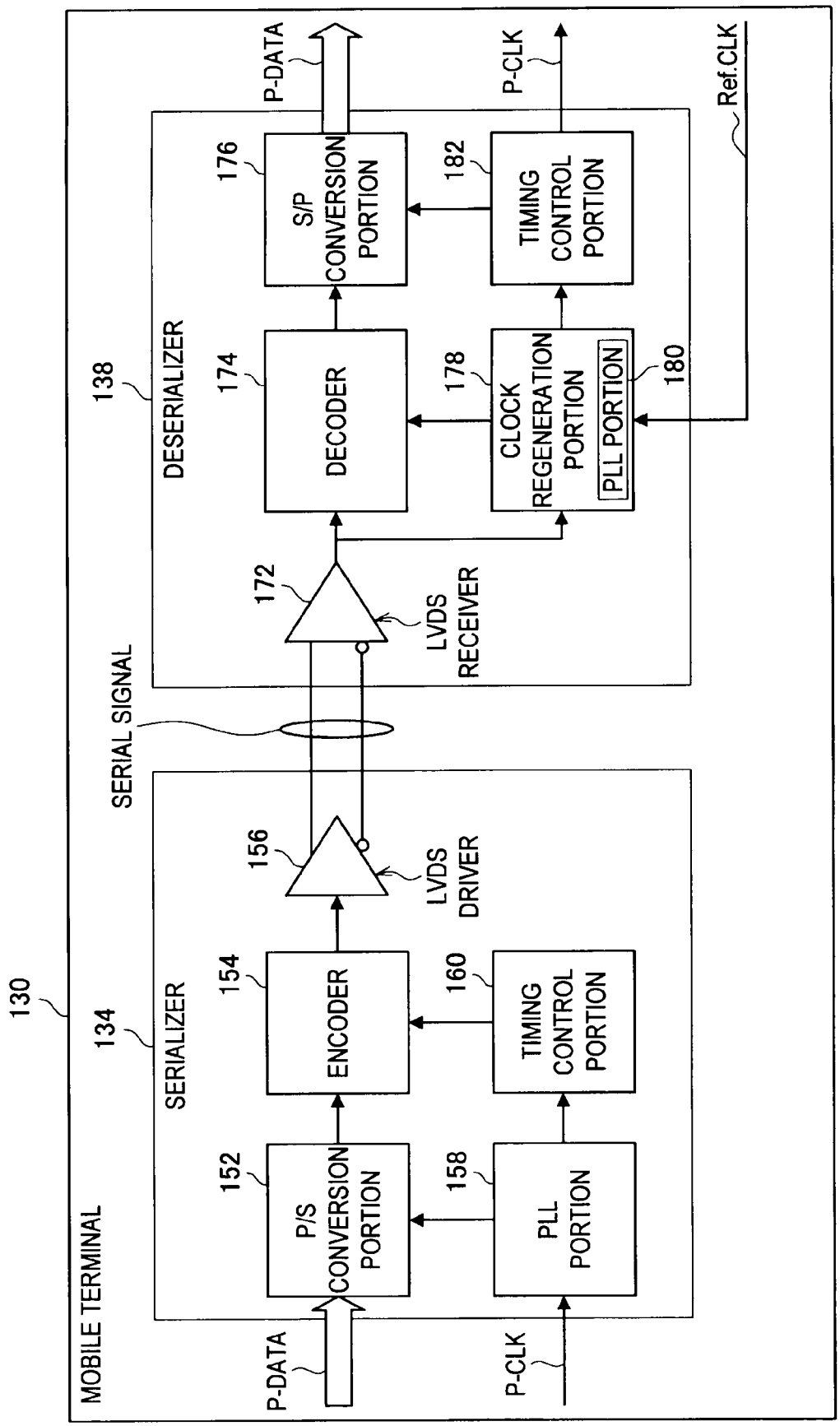
FIG. 3 is an explanatory figure that shows an example of a functional configuration of a mobile terminal that uses serial transmission.

Next, a functional configuration of the mobile terminal 130 that uses the serial transmission method will be explained with reference to FIG. 3. FIG. 3 is an explanatory figure that shows an example of the functional configuration of the mobile terminal 130 that uses the serial transmission method. However, FIG. 3 is an explanatory figure that mainly illustrates the functional configurations of the serializer 134 and the deserializer 138, so descriptions of the other configuring elements will be omitted.

Serializer 134

As shown in FIG. 3, the serializer 134 is configured from a P/S conversion portion 152, an encoder 154, an LVDS driver 156, a PLL 158, and a timing control portion 160.

As shown in FIG. 3, the parallel signal (P-DATA) and the parallel signal clock (P-CLK) are input from the BBP 110 to the serializer 134. The parallel signal that is input to the serializer 134 is converted into a serial signal by the P/S conversion portion 152. The serial signal that has been converted by the P/S conversion portion 152 is input to the encoder 154. The encoder 154 appends a header and the like to the serial signal and inputs it to the LVDS driver 156. The LVDS driver 156 transmits the input serial signal to the deserializer 138 by a differential transmission method according to LVDS.

In contrast, the parallel signal clock that is input to the serializer 134 is input to the PLL 158. The PLL 158 generates a serial signal clock from the parallel signal clock and inputs it to the P/S conversion portion 152 and to the timing control portion 160. The timing control portion 160 controls the timing of the transmission of the serial signal by the encoder 154, based on the serial signal clock that is input.

Deserializer 138

As shown in FIG. 3, the deserializer 138 is mainly configured from an LVDS receiver 172, a decoder 174, an S/P conversion portion 176, a clock regeneration portion 178, a PLL 180, and a timing control portion 182.

As shown in FIG. 3, the serial signal is transmitted to the deserializer 138 by the differential transmission method according to LVDS. The serial signal is received by the LVDS receiver 172. The serial signal that is received by the LVDS receiver 172 is input to the decoder 174 and to the clock regeneration portion 178. The decoder 174 detects the beginning portion of the data by referring to the header in the input serial signal and inputs the signal to the S/P conversion portion 176. The S/P conversion portion 176 converts the input serial signal into the parallel signal (P-DATA). The parallel signal that has been converted by the S/P conversion portion 176 is output to the LCD 104.

For its part, the clock regeneration portion 178 uses the built-in PLL 180 to regenerate the parallel signal clock from the serial signal clock by referring to a reference clock that is input from the outside. The parallel signal clock that has been regenerated by the clock regeneration portion 178 is input to the decoder 174 and to the timing control portion 182. The timing control portion 182 controls the receiving timing based on the parallel signal clock that is input from the clock regeneration portion 178. The parallel signal clock (P-CLK) that is input to the timing control portion 182 is output to the LCD 104.

In this manner, the parallel signal (P-DATA) and the parallel signal clock (P-CLK) that are input to the serializer 134 from the BBP 110 are converted into the serial signals and transmitted to the deserializer 138. The input serial signals are then restored by the deserializer 138 to the original parallel signal and parallel signal clock and are output to the LCD 104.

As in the mobile terminal 130 that is explained above, the transmission path is serialized by converting the parallel signal into the serial signal and transmitting the serial signal. The range of movement of the portion through which the serial signal path passes is enlarged as a result, and the degree of freedom in the disposition of the display portion 102 is increased. Therefore, in a case where the mobile terminal 130 is used to watch and listen to a television broadcast or the like, for example, it is possible to transform the mobile terminal 130 such that the display portion 102 is disposed in a landscape orientation from the user's point of view. The increase in the degree of freedom brings with it a wider range of uses for the mobile terminal 130, such that with the addition of various types of communication terminal functions, a wide variety of uses becomes possible, such as watching videos, listening to music, and the like.

Against this backdrop, the LCD 104 of the mobile terminal 130 has come to be provided with higher density that makes a more detailed display possible, such that large amounts of information can be displayed in the form of small text characters and video images. However, the small text characters and video images are difficult for the user to see. Accordingly, there is user demand for the text characters and video images that are displayed on the LCD 104 of the mobile terminal 130 to be output to a large screen, such as an externally provided television receiver, display device, or the like. In response to the demand, output configurations have been proposed such as that of a mobile terminal 190 that is shown in FIG. 4. This output configuration will be briefly explained below.

Use Example 1: External Output Method that Uses Electromagnetic Coupling

Figure 4A:
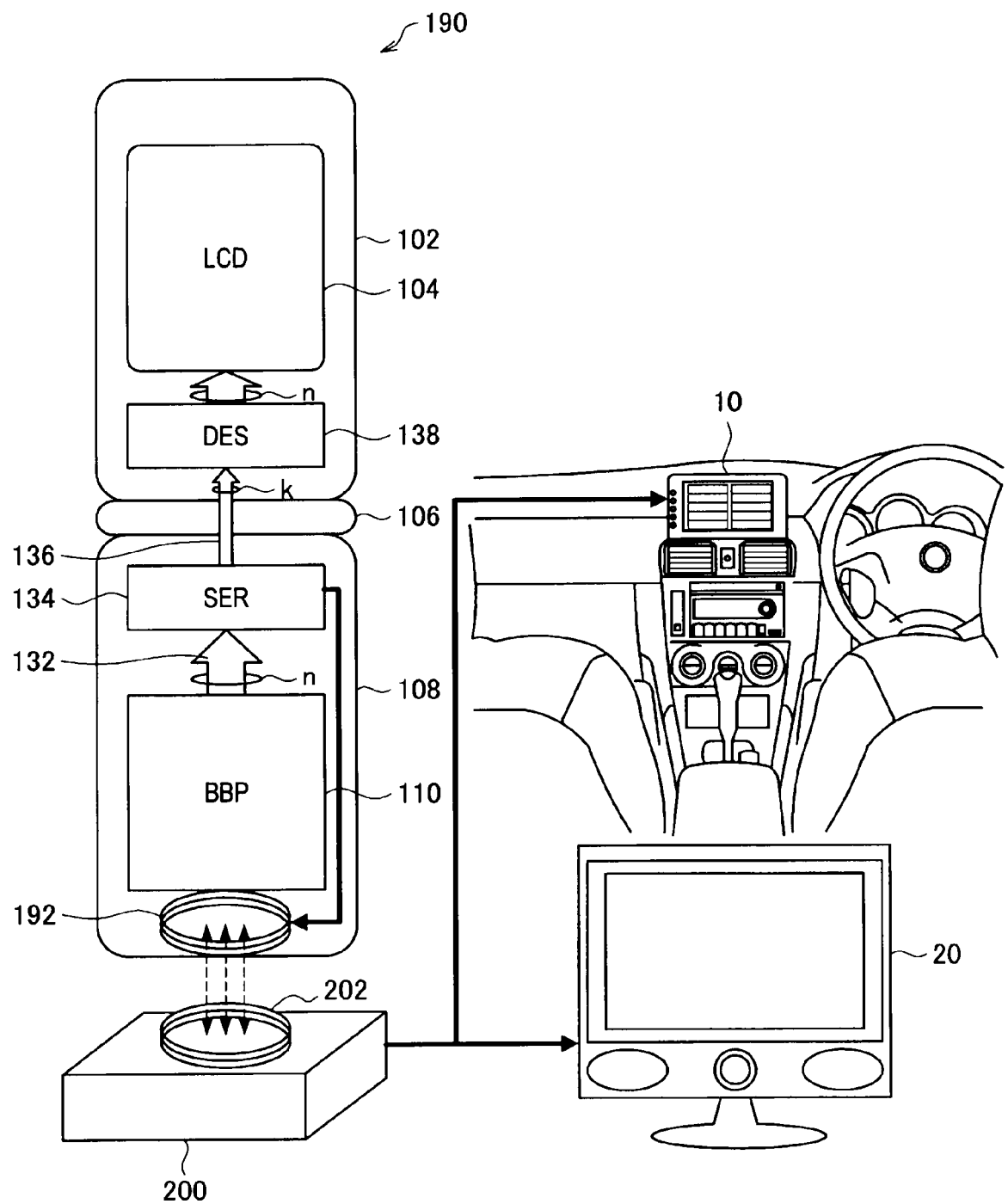
FIG. 4A is an explanatory figure that shows an example of a configuration of a mobile terminal.

First, refer to FIG. 4A. FIG. 4A is an explanatory figure that shows an example of a configuration of the mobile terminal 190 that is capable of using electromagnetic coupling to transmit data such as video or the like to an external output device. The external output device may be a car navigation system 10, a television receiver 20, or the like. Additional examples of the external output device include a display device for a personal computer, a projector that projects video onto a screen, and the like.

As shown in FIG. 4A, a signal reading device 200 is used to transmit data such as video or the like to the external output device. The signal reading device 200 may be connected to the car navigation system 10, the television receiver 20, or the like, and it may also be built into the devices. Signals are transmitted between the mobile terminal 190 and the signal reading device 200 using electromagnetic coupling. A coil 192 is provided in the mobile terminal 190 for that purpose. Further, a coil 202 is provided in the signal reading device 200.

Consider, for example, an operation in a case where a video signal is transmitted from the mobile terminal 190 to the television receiver 20. First, in the mobile terminal 190, the BBP 110 generates a parallel signal in order to transmit the video signal by parallel transmission. The parallel signal is then transmitted through the parallel signal path 132 to the serializer 134. The serializer 134 converts the transmitted parallel signal into a serial signal and transmits it through the serial signal path 136. At this point, an electric current signal that corresponds to the serial signal is applied to the coil 192, and an electromagnetic field is generated by the coil 192. The electromagnetic field induces an electric current to flow in the coil 202 of the signal reading device 200, and the serial signal is demodulated based on the electric current.

In this manner, the electromagnetic coupling between the mobile terminal 190 and the signal reading device 200 is used to transmit the serial signal that corresponds to the video signal. Of course, the serial signal is transmitted after being encoded by a specified encoding method and modulated by a specified modulation method, such as amplitude shift keying (ASK) or the like. However, a signal that is encoded by the NRZ encoding method contains a direct current component, so it is not suitable for signal transmission using electromagnetic coupling. Therefore, one of the Manchester encoding method and another method that does not include a direct current component in the encoded signal is used for signal transmission by electromagnetic coupling.

In the example is FIG. 4A, the serial signal is encoded by the serializer 134 according to the Manchester encoding method and transmitted using electromagnetic coupling. In this case, it is appropriate for the decoding in the signal reading device 200 to be done in accordance with the Manchester encoding method. Therefore, the signal reading device 200 receives the encoded signal and decodes into the serial signal, then converts the serial signal into a parallel signal and outputs it to the television receiver 20. In the Manchester code, "1" is transmitted as "10", and "0" is transmitted as "01", so a transmission speed is required that is twice that of a method that simply transmits "1" and "0". However, because the Manchester code does not contain a direct current component and the clock is easily extracted, it is well suited to signal transmission using electromagnetic coupling.

Figure 4B:
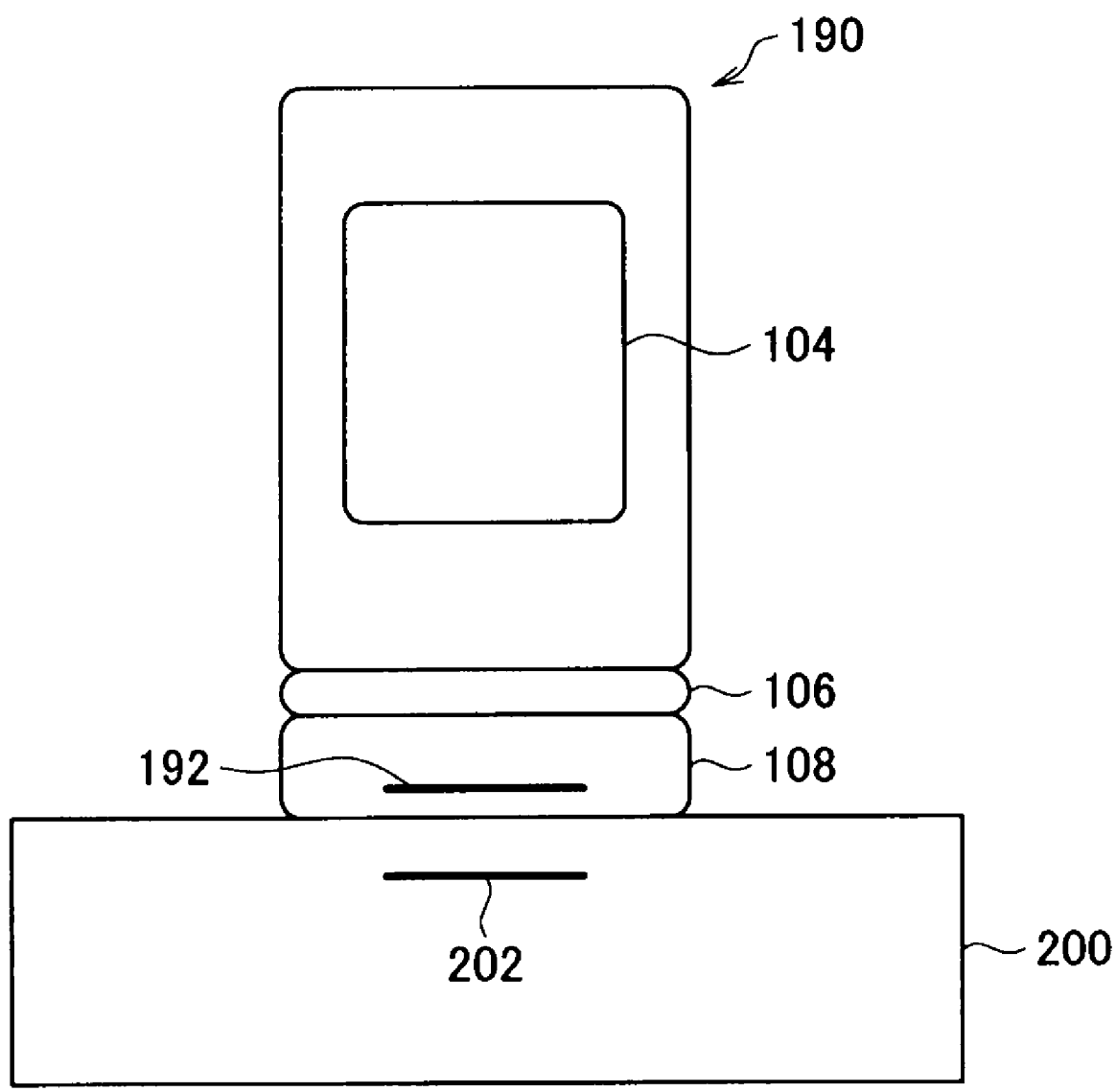
FIG. 4B is an explanatory figure that shows a state of connection between the mobile terminal and a signal reading device.

Incidentally, the signal transmission between the mobile terminal 190 and the signal reading device 200 is performed by placing them in close proximity to one another, as shown in FIG. 4B. Communication that is performed in this sort of configuration is called non-contact communication in some cases. In the example in FIG. 4B, the display portion 102 of the mobile terminal 190 is disposed in an open state, but the display portion 102 may also be disposed in a closed state. In most cases, the power supply to the LCD 104 is turned off when the display portion 102 of the mobile terminal 190 is closed, so this saves on power consumption. At this time, a mode is set that enables data transmission to the external output device even though the display portion 102 is in a closed state.

Functional Configuration: Mobile Terminal 190

Figure 5:
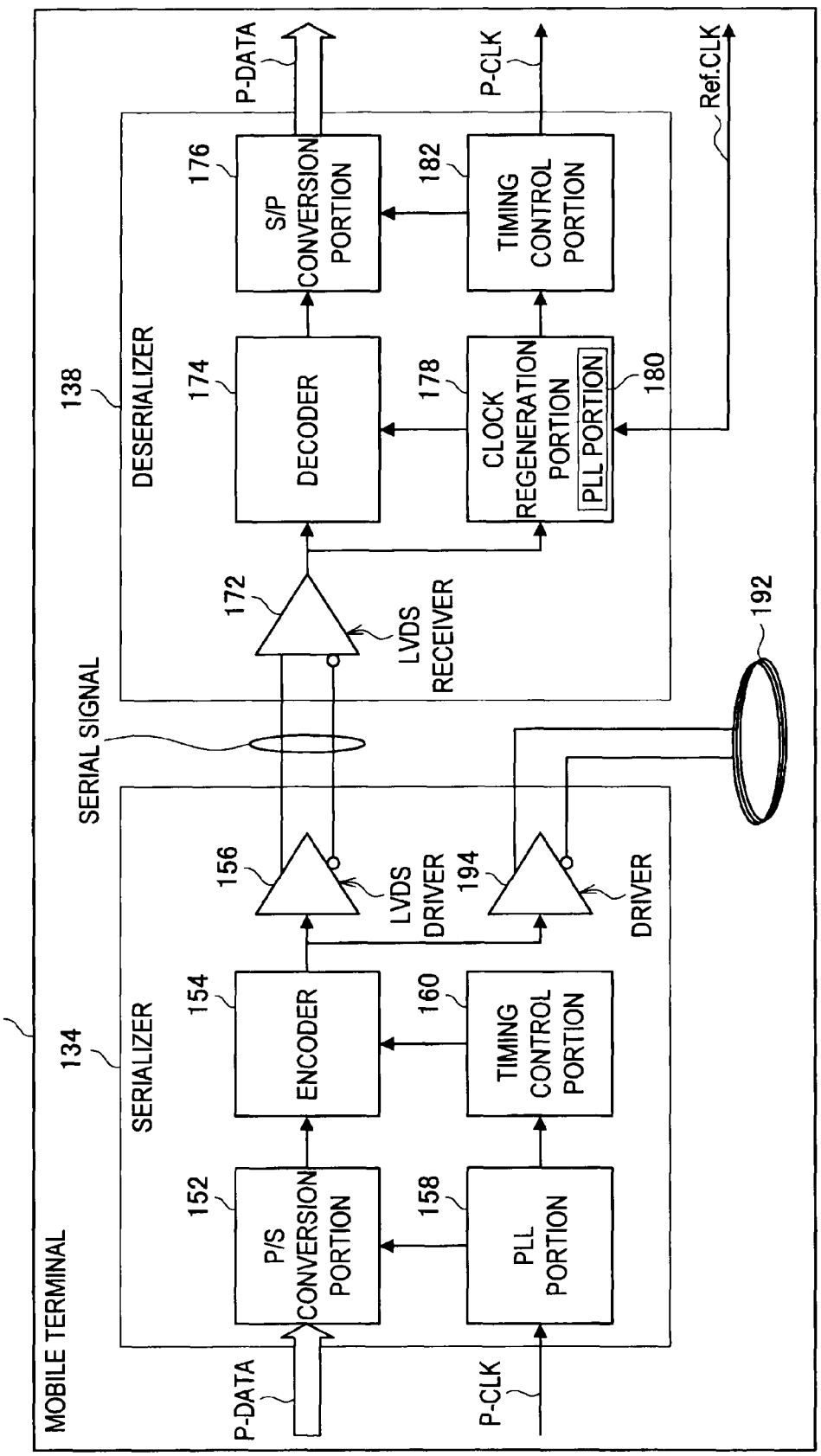
FIG. 5 is an explanatory figure that shows an example of a functional configuration of a mobile terminal that uses serial transmission.

Next, a functional configuration of the mobile terminal 190 will be briefly explained with reference to FIG. 5. FIG. 5 is an explanatory figure that shows an example of the functional configuration of the mobile terminal 190. However, FIG. 5 is an explanatory figure that mainly illustrates the functional configurations of the serializer 134 and the deserializer 138, so descriptions of the other configuring elements will be omitted. Note also that configuring elements of the mobile terminal 190 that have substantially the same function as in the mobile terminal 130 that has already been described are denoted by the same reference numerals and detailed explanations will be omitted.

Serializer 134

As shown in FIG. 5, the serializer 134 is configured from the P/S conversion portion 152, the encoder 154, the LVDS driver 156, the PLL 158, the timing control portion 160, and a driver 194.

As shown in FIG. 5, the parallel signal (P-DATA) and the parallel signal clock (P-CLK) are input from the BBP 110 to the serializer 134. The parallel signal that is input to the serializer 134 is converted into a serial signal by the P/S conversion portion 152. The serial signal that has been converted by the P/S conversion portion 152 is input to the encoder 154.

The encoder 154 appends a header and the like to the serial signal, encodes the serial signal by the Manchester encoding method, and inputs the serial signal to the LVDS driver 156 and the driver 194. The LVDS driver 156 transmits the input serial signal to the deserializer 138 by a differential transmission method according to LVDS. For its part, the driver 194, using electromagnetic coupling by the coil 192, transmits the input serial signal to the signal reading device 200.

In contrast, the parallel signal clock that is input to the serializer 134 is input to the PLL 158. The PLL 158 generates a serial signal clock from the parallel signal clock and inputs it to the P/S conversion portion 152 and to the timing control portion 160. The timing control portion 160 controls the timing of the transmission of the serial signal by the encoder 154, based on the serial signal clock that is input.

Deserializer 138

As shown in FIG. 5, the deserializer 138 is mainly configured from the LVDS receiver 172, the decoder 174, the S/P conversion portion 176, the clock regeneration portion 178, the PLL 180, and the timing control portion 182.

As shown in FIG. 5, the serial signal is transmitted from the serializer 134 to the deserializer 138 by the differential transmission method according to LVDS. The serial signal is received by the LVDS receiver 172. The serial signal that is received by the LVDS receiver 172 is input to the decoder 174 and to the clock regeneration portion 178. The decoder 174 detects the beginning portion of the data by referring to the header in the input serial signal, decodes the serial signal that was encoded by the Manchester encoding method, and inputs the signal to the S/P conversion portion 176. The S/P conversion portion 176 converts the input serial signal into the parallel signal (P-DATA). The parallel signal that has been converted by the S/P conversion portion 176 is output to the LCD 104.

For its part, the clock regeneration portion 178 uses the built-in PLL 180 to regenerate the parallel signal clock from the serial signal clock by referring to a reference clock that is input from the outside. The parallel signal clock that has been regenerated by the clock regeneration portion 178 is input to the decoder 174 and to the timing control portion 182. The timing control portion 182 controls the receiving timing based on the parallel signal clock that is input from the clock regeneration portion 178. The parallel signal clock (P-CLK) that is input to the timing control portion 182 is output to the LCD 104.

In this manner, the parallel signal (P-DATA) and the parallel signal clock (P-CLK) that are input to the serializer 134 from the BBP 110 are converted into the serial signals and transmitted to the deserializer 138. The input serial signals are then restored by the deserializer 138 to the original parallel signal and parallel signal clock and are output to the LCD 104.

Functional Configuration: Signal Reading Device 200

Figure 6:
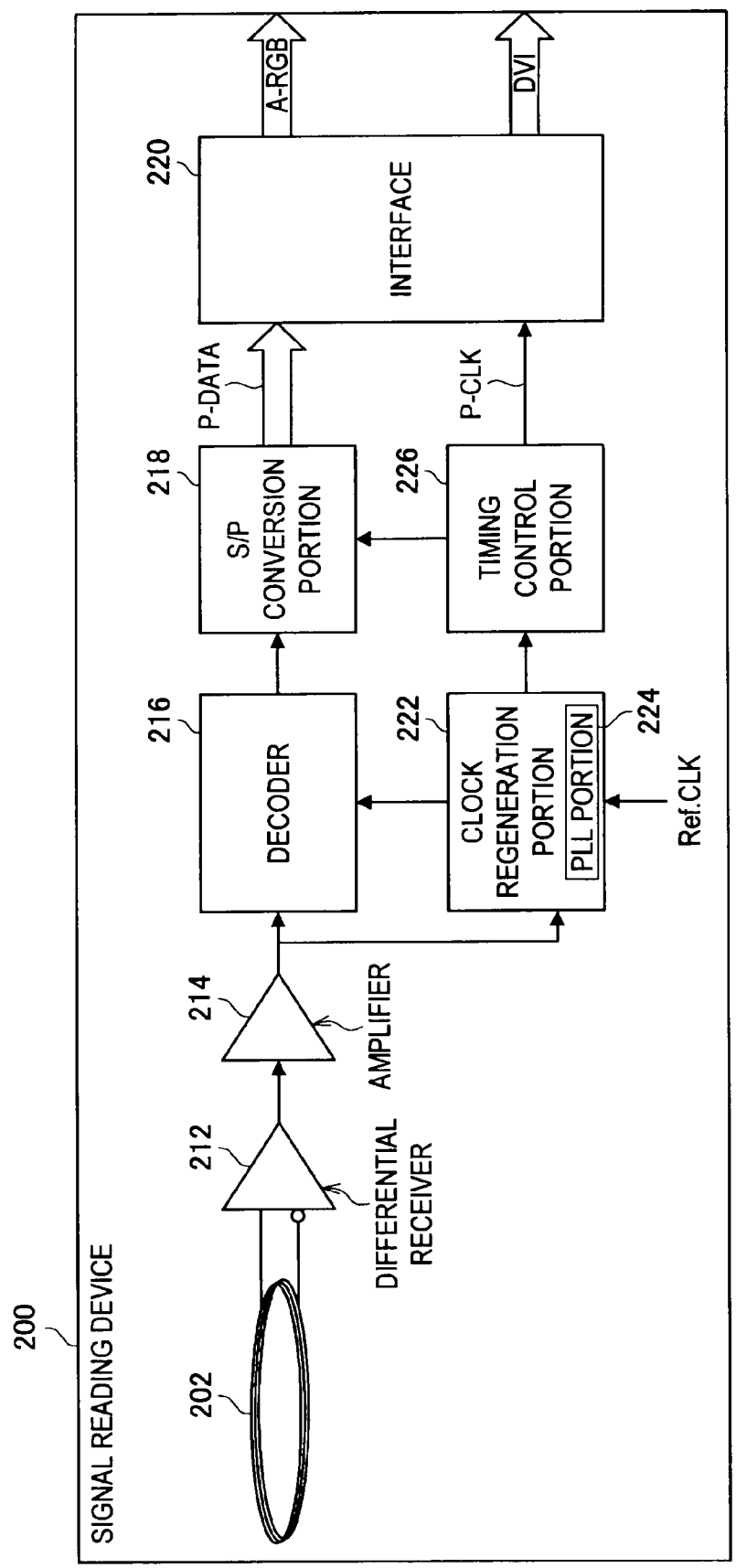
FIG. 6 is an explanatory figure that shows an example of a functional configuration of a signal reading device that uses serial transmission.

Next, a functional configuration of the signal reading device 200 will be briefly explained with reference to FIG. 6. FIG. 6 is an explanatory figure that shows an example of the functional configuration of the signal reading device 200.

As shown in FIG. 6, the signal reading device 200 is mainly configured from the coil 202, a differential receiver 212, an amplifier 214, a decoder 216, an S/P conversion portion 218, an interface 220, a clock regeneration portion 222, a PLL 224, and a timing control portion 226.

As described above, the serial signal is transmitted from the mobile terminal 190 to the signal reading device 200 using electromagnetic coupling. The serial signal is received by the differential receiver 212 using the coil 202. The differential receiver 212 inputs the received serial signal to the amplifier 214. The amplifier 214 is provided in order to amplify the signal level of the serial signal, the level having been lowered by the signal transmission by electromagnetic coupling. The serial signal that has been amplified by the amplifier 214 is input to the decoder 216 and the clock regeneration portion 222.

The decoder 216 detects the beginning portion of the data by referring to the header in the input serial signal, decodes the serial signal that was encoded by the Manchester encoding method, and inputs the signal to the S/P conversion portion 218. The S/P conversion portion 218 converts the input serial signal into the parallel signal (P-DATA). The parallel signal that has been converted by the S/P conversion portion 218 is output to the interface 220.

For its part, the clock regeneration portion 222 uses the built-in PLL 224 to regenerate the parallel signal clock from the serial signal clock by referring to a reference clock that is input from the outside. The parallel signal clock that has been regenerated by the clock regeneration portion 222 is input to the decoder 216 and to the timing control portion 226. The timing control portion 226 controls the receiving timing based on the parallel signal clock that is input from the clock regeneration portion 222. The parallel signal clock (P-CLK) that is input to the timing control portion 226 is output to the interface 220.

The interface 220 converts the parallel signal and the parallel signal clock that are input into a signal configuration that is compatible with the external output device. For example, the interface 220 may convert the input parallel signal into an analog RGB signal and a Digital Visual Interface (DVI) signal and output it to the car navigation system 10, the television receiver 20, and the like.

The functional configurations of the mobile terminal 190 and the signal reading device 200 have been explained above. The functions that are described above make it easy for the user to output video and the like to an external output device simply by setting the mobile terminal 190 in place on top of the signal reading device 200. It is therefore possible to output video and the like from the mobile terminal 190 to a large screen. Accordingly, the mobile terminal 190, in addition to its use as a simple communication device for an individual, can also be made to function as a TV telephone that is used by a large number of people.

Use Example 2: Data Transmission Method that Uses a Power Supply Line

The mobile terminal 190 that is described above uses as the encoding method the Manchester encoding method, which does not contain a direct current component. The encoded signal that does not contain a direct current component can be transmitted by superposing it on the power supply. Accordingly, a technology will be explained that utilizes a power supply line for the mobile terminal 190 that is described above. A mobile terminal 230 is an example of a configuration that uses this technology.

Functional Configuration

Figure 7A:
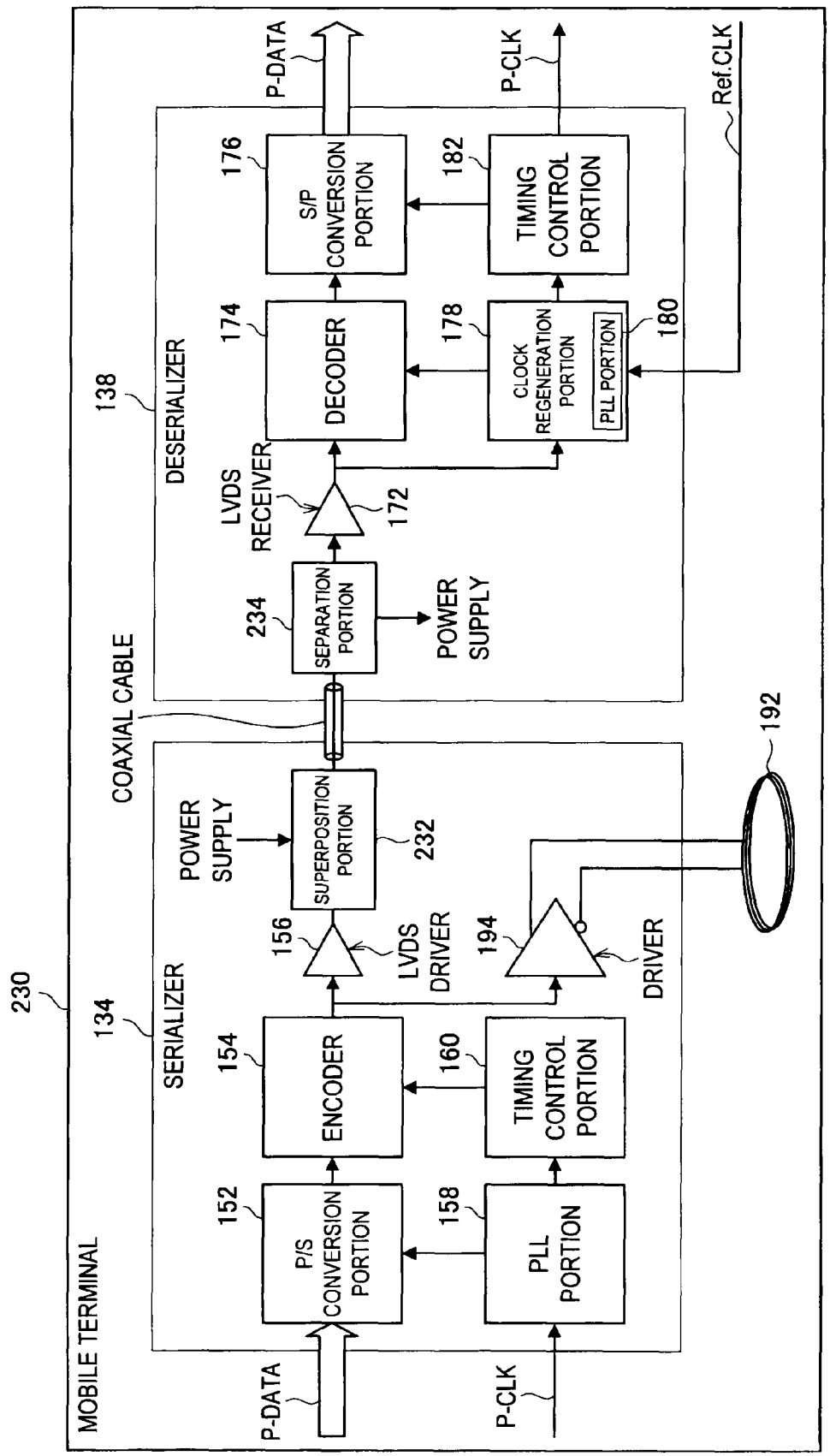
FIG. 7A is an explanatory figure that shows an example of a functional configuration of a mobile terminal that uses serial transmission.

Next, a functional configuration of the mobile terminal 230 that is capable of using the power supply line to transmit data will be explained with reference to FIG. 7A. FIG. 7A is an explanatory figure that shows an example of the functional configuration of the mobile terminal 230 that is capable of using the power supply line to transmit data. However, FIG. 7A is an explanatory figure that mainly illustrates the functional configurations of the serializer 134 and the deserializer 138, so descriptions of the other configuring elements will be omitted. Note also that configuring elements of the mobile terminal 230 that have substantially the same function as in the mobile terminal 190 that has already been described are denoted by the same reference numerals and detailed explanations will be omitted.

Serializer 134

As shown in FIG. 7A, the serializer 134 is configured from the P/S conversion portion 152, the encoder 154, the LVDS driver 156, the PLL 158, the timing control portion 160, the driver 194, and a superposition portion 232.

As shown in FIG. 7A, the parallel signal (P-DATA) and the parallel signal clock (P-CLK) are input from the BBP 110 to the serializer 134. The parallel signal that is input to the serializer 134 is converted into a serial signal by the P/S conversion portion 152. The serial signal that has been converted by the P/S conversion portion 152 is input to the encoder 154. The encoder 154 appends a header and the like to the serial signal, encodes the serial signal by a method with no (or little) direct current component, such as the Manchester encoding method or the like, and inputs the signal to the LVDS driver 156 and the driver 194.

The LVDS driver 156 turns the input serial signal into LVDS and inputs it to the superposition portion 232. The superposition portion 232 takes the signal that has been input from the LVDS driver 156 and transmits it to the deserializer 138 by superposing it on the power supply line. For example, the superposition portion 232 may couple the signal and the power supply using a capacitor for the signal and a choke coil for the power supply. Note that a coaxial cable, for example, may be used as the transmission path for the power supply line. Note also that the power supply line is a path that is provided in order to supply electric power from the operation portion 108 to the display portion 102. For its part, the driver 194, using electromagnetic coupling by the coil 192, transmits the input serial signal to the signal reading device 200.

Incidentally, the parallel signal clock that is input to the serializer 134 is input to the PLL 158. The PLL 158 generates a serial signal clock from the parallel signal clock and inputs it to the P/S conversion portion 152 and to the timing control portion 160. The timing control portion 160 controls the timing of the transmission of the serial signal by the encoder 154, based on the serial signal clock that is input.

Deserializer 138

As shown in FIG. 7A, the deserializer 138 is mainly configured from the LVDS receiver 172, the decoder 174, the S/P conversion portion 176, the clock regeneration portion 178, the PLL 180, the timing control portion 182, and a separation portion 234.

Figure 7B:
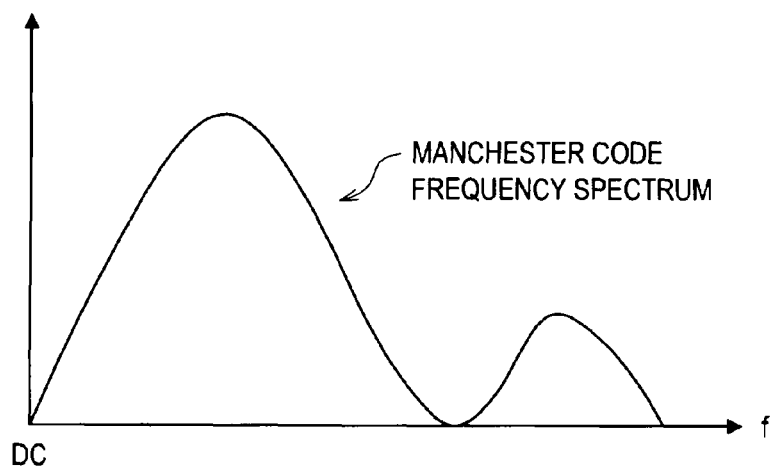
FIG. 7B is an explanatory figure that shows an example of a frequency spectrum for a Manchester code.

As shown in FIG. 7A, the signal in which the serial signal is superposed on the power supply is transmitted to the deserializer 138 through the power supply line (the coaxial cable). The frequency spectrum of the superposed signal is like that in FIG. 7B. As shown in FIG. 7B, the frequency spectrum of the Manchester code does not have a direct current component, so the signal can be transmitted together with the (DC) power supply.

Refer once again to FIG. 7A. The superposed signal that is described above is separated into the serial signal and the power supply by the separation portion 234. For example, the separation portion 234 may extract the serial signal by using a capacitor to cut the direct current component and may extract the power supply by using a choke coil to cut the high-frequency component. The serial signal that has been separated by the separation portion 234 is received by the LVDS receiver 172.

The serial signal that is received by the LVDS receiver 172 is input to the decoder 174 and to the clock regeneration portion 178. The decoder 174 detects the beginning portion of the data by referring to the header in the input serial signal, decodes the serial signal that was encoded by the Manchester encoding method, and inputs the signal to the S/P conversion portion 176. The S/P conversion portion 176 converts the input serial signal into the parallel signal (P-DATA). The parallel signal that has been converted by the S/P conversion portion 176 is output to the LCD 104.

For its part, the clock regeneration portion 178 uses the built-in PLL 180 to regenerate the parallel signal clock from the serial signal clock by referring to a reference clock that is input from the outside. The parallel signal clock that has been regenerated by the clock regeneration portion 178 is input to the decoder 174 and to the timing control portion 182. The timing control portion 182 controls the receiving timing based on the parallel signal clock that is input from the clock regeneration portion 178. The parallel signal clock (P-CLK) that is input to the timing control portion 182 is output to the LCD 104.

In this manner, the mobile terminal 230 that is described above can transmit the power supply and the serial signal (a video signal or the like) through a single coaxial cable. The operation portion 108 and the display portion 102 are therefore connected by only one cable, making it possible to increase the movability of the display portion 102 and to transform the mobile terminal 230 into a complicated shape.

This broadens the range of uses for the mobile terminal 230 and also improves convenience for the user.

Summary of Issues I

As explained above, a parallel transmission method like that of the mobile terminal 100 that is described above is not well suited to freely changing the positional relationship of the operation portion 108 and the display portion 102. Accordingly, providing the serializer 134 and the deserializer 138, as in the mobile terminal 130 that is described above, makes serial transmission of a video signal and the like possible and increases the range of movement of the display portion 102. Furthermore, the problem of the small size of the text characters, video images, and the like that are displayed on the LCD 104 has been solved by using electromagnetic coupling, as in the mobile terminal 190, to enable output to a large external screen. In addition, the movability of the display portion 102 has been increased by using a method that superposes the signal on the power supply line for transmission, taking advantage of the characteristics of the encoding method that is used by the mobile terminal 190.

However, as shown in FIGS. 3, 5, 6, and 7A, in the mobile terminals 130, 190, and 230, and in the signal reading device 200, the PLLs 180 and 224 are used in order to regenerate the clock from the received serial signal. The PLLs are necessary in order to extract the clock from the signal that has been encoded by the Manchester encoding method. However, because the amount of electric power that is consumed by the PLLs themselves is not small, providing the PLLs increases the electric power that is consumed by the mobile terminals 130, 190, and 230, and by the signal reading device 200, to that extent. This increase in the amount of electric power that is consumed is an extremely serious problem for a small device such as a mobile telephone or the like.

Against the backdrop of this problem, demand has grown for a technology that will allow the deserializer 138 and the signal reading device 200 to be configured without providing them with the PLLs. Accordingly, a new signal transmission method has been proposed that addresses these technical issues and transmits a signal using a code that does not contain a direct current component and also does not require a PLL circuit when the clock is regenerated. In the explanation that follows, this signal transmission method is simply called the new method in some cases.

Basic Technology: New Method

The new signal transmission method (the new method) that transmits a signal using a code that does not contain a direct current component and does not require a PLL circuit when the clock is regenerated will be explained below. First the basic Alternate Mark Inversion (AMI) code will be briefly explained before the encoding method of the new method is explained. Then a functional configuration of a mobile terminal 300 according to the new method and the encoding method will be explained.

Signal Waveform of the AMI Code

Figure 8:
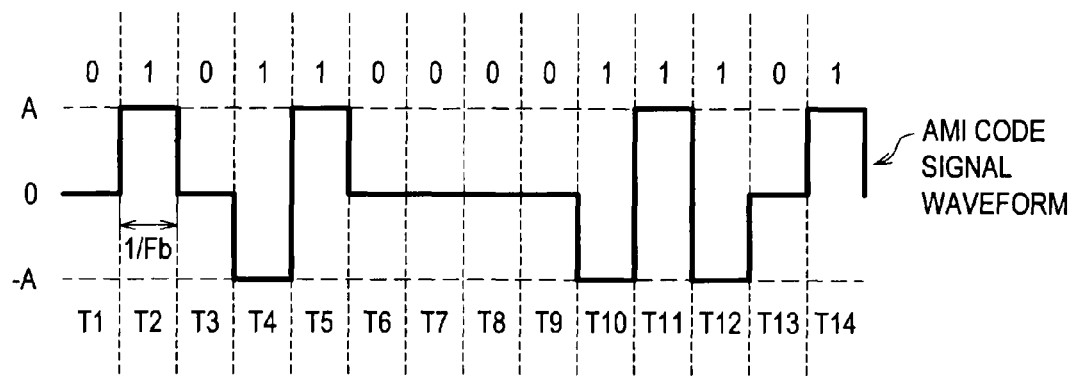
FIG. 8 is an explanatory figure that shows an example of a signal waveform of an AMI code.

First, the signal waveform and the characteristics of the AMI code will be briefly explained with reference to FIG. 8. FIG. 8 is an explanatory figure that shows an example of the signal waveform of the AMI code. However, in the explanation that follows, A will be treated as any positive number.

The AMI code is a code that uses an electrical potential of zero to express a data value of zero and potentials of A and −A to express a data value of 1. Note, however, that the potential A and the potential −A are used alternately. That is, after a data value of I has been expressed by the potential A, if the next data bit is also a 1, that 1 will be expressed by the potential −A. Because the data values are expressed by repeatedly inverting the polarity in this manner, the AMI code does not contain a direct current component. Note that other codes with the same type of characteristics as the AMI code include, for example, the partial response code that expresses the data as PR (1, −1), PR (1, 0, −1), PR (1, 0, . . . , −1), and the like. Signal codes that use this sort of polarity inversion are called bipolar codes. A dicode method or the like can also be used. An AMI code with a 100% duty factor will be used as an example in explaining the new method.

FIG. 8 schematically illustrates an AMI code with bit intervals T1 to T14. In FIG. 8, a data value of 1 is expressed at bit intervals T2, T4, T5, T10, T11, T12, and T14. Because the potential is A at bit interval T2, the potential at bit interval T4 is −A. Then at bit interval T5, the potential is A. Thus the amplitude that corresponds to a data value of 1 is alternately inverted between positive and negative values. This is the polarity inversion that is described above.

In contrast, a data value of zero is always expressed by a potential of zero. This form of expression prevents the AMI code from containing a direct current component, but it sometimes results in consecutive potentials of zero, as seen in bit intervals T6 to T9 in FIG. 8. The consecutive potentials of zero make it difficult to extract the clock from the signal waveform without using a PLL. Accordingly, the new method uses a technology that includes a clock component in the AMI code (or in a code that has equivalent characteristics) before transmitting the signal.

Functional Configuration

Figure 9:
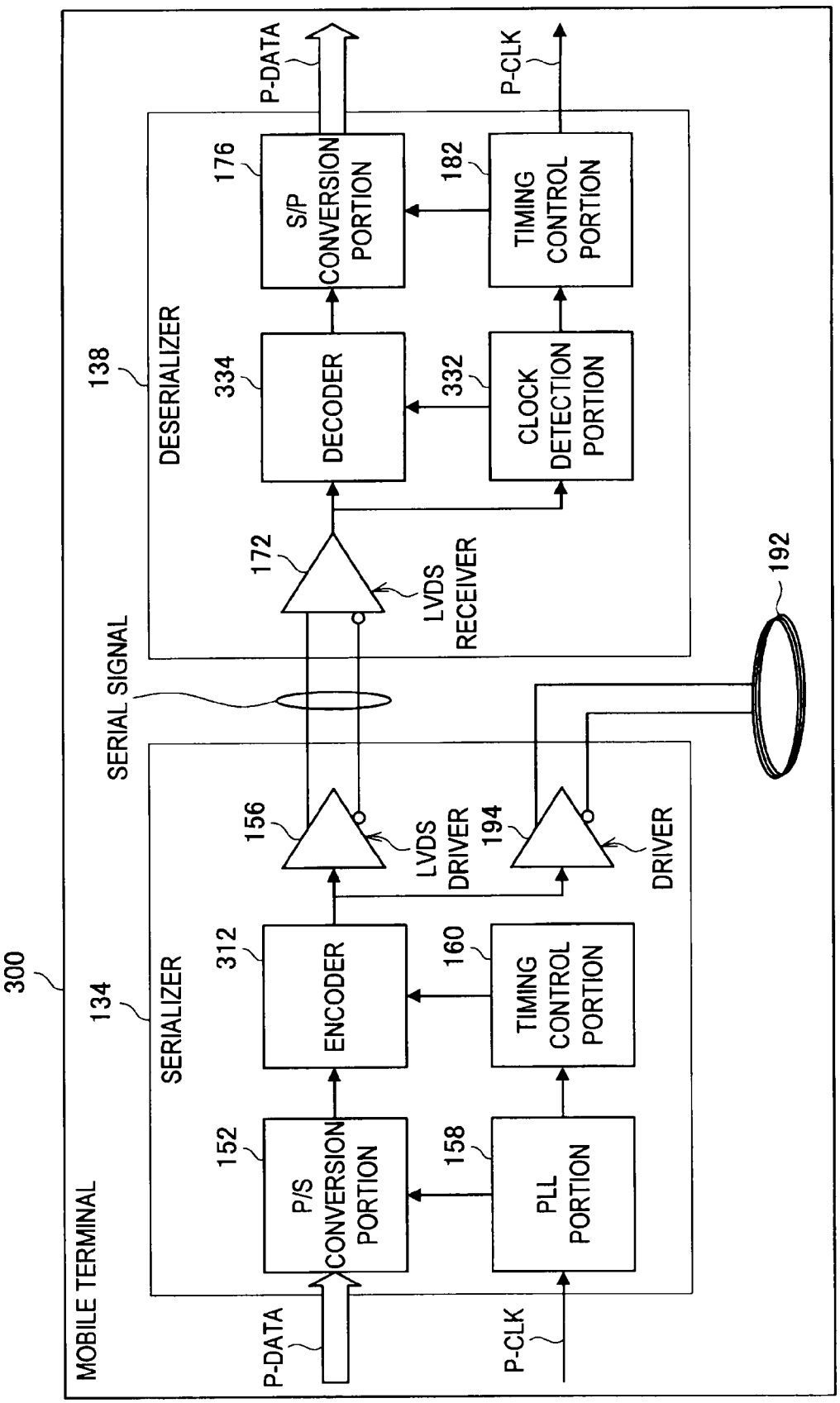
FIG. 9 is an explanatory figure that shows an example of a functional configuration of a mobile terminal that uses a new method.

Next, a functional configuration of the mobile terminal 300 according to the new method will be explained with reference to FIG. 9. FIG. 9 is an explanatory figure that shows an example of the functional configuration of the mobile terminal 300 according to the new method. However, FIG. 9 is an explanatory figure that mainly illustrates the functional configurations of the serializer 134 and the deserializer 138, so descriptions of the other configuring elements will be omitted. Note also that configuring elements of the mobile terminal 300 that have substantially the same function as in the mobile terminal 190 that has already been described are denoted by the same reference numerals and detailed explanations will be omitted.

Serializer 134

As shown in FIG. 9, the serializer 134 is configured from the P/S conversion portion 152, the LVDS driver 156, the PLL 158, the timing control portion 160, the driver 194, and an encoder 312. The main point of difference from the mobile terminal 190 that was described earlier is in the function of the encoder 312.

As shown in FIG. 9, the parallel signal (P-DATA) and the parallel signal clock (P-CLK) are input from the BBP 110 to the serializer 134. The parallel signal that is input to the serializer 134 is converted into a serial signal by the P/S conversion portion 152. The serial signal that has been converted by the P/S conversion portion 152 is input to the encoder 312. The encoder 312 appends a header and the like to the serial signal and encodes the serial signal by a specified encoding method.

Figure 10:
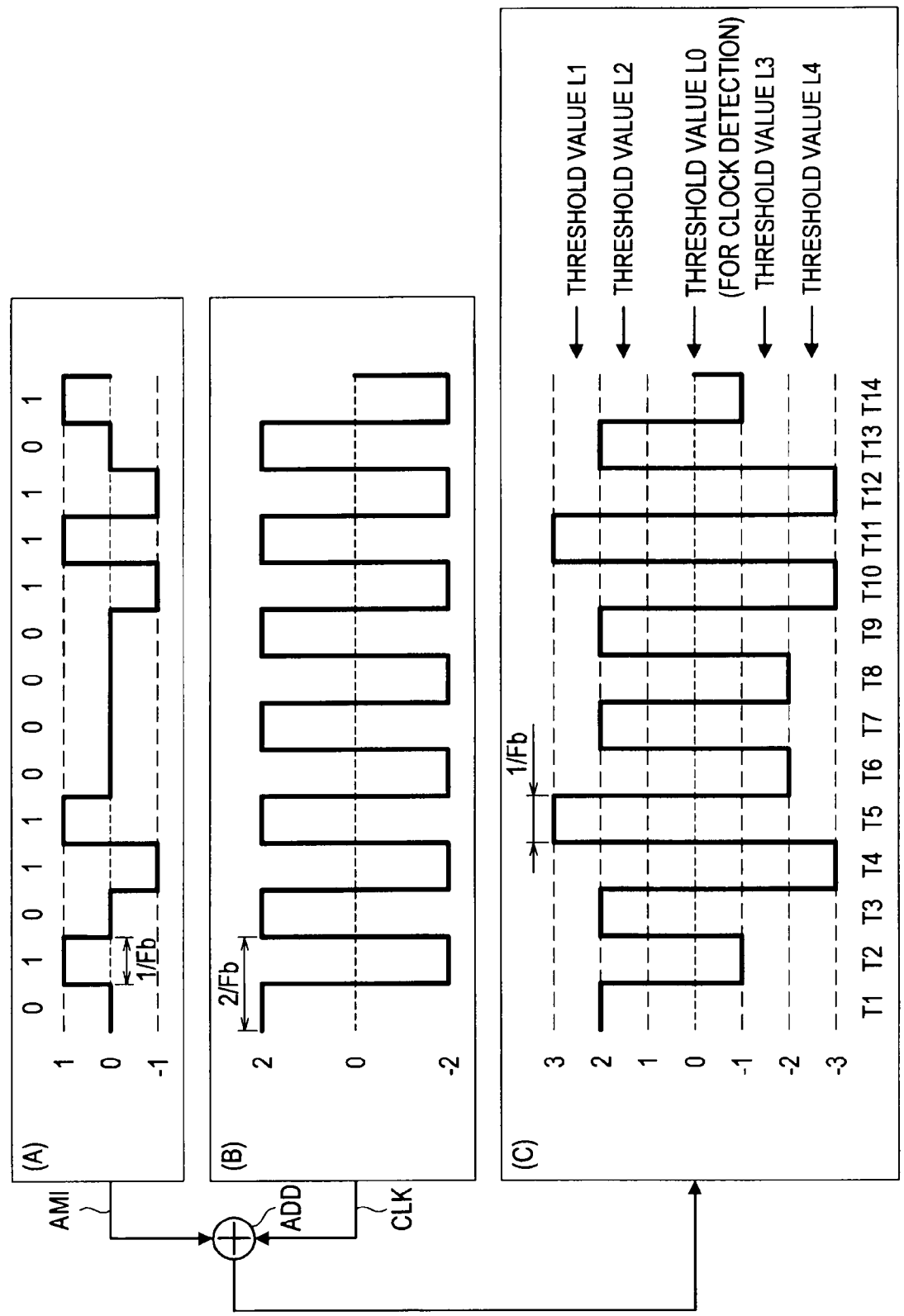
FIG. 10 is an explanatory figure that shows a signal generation method according to the new method.
Figure 11:
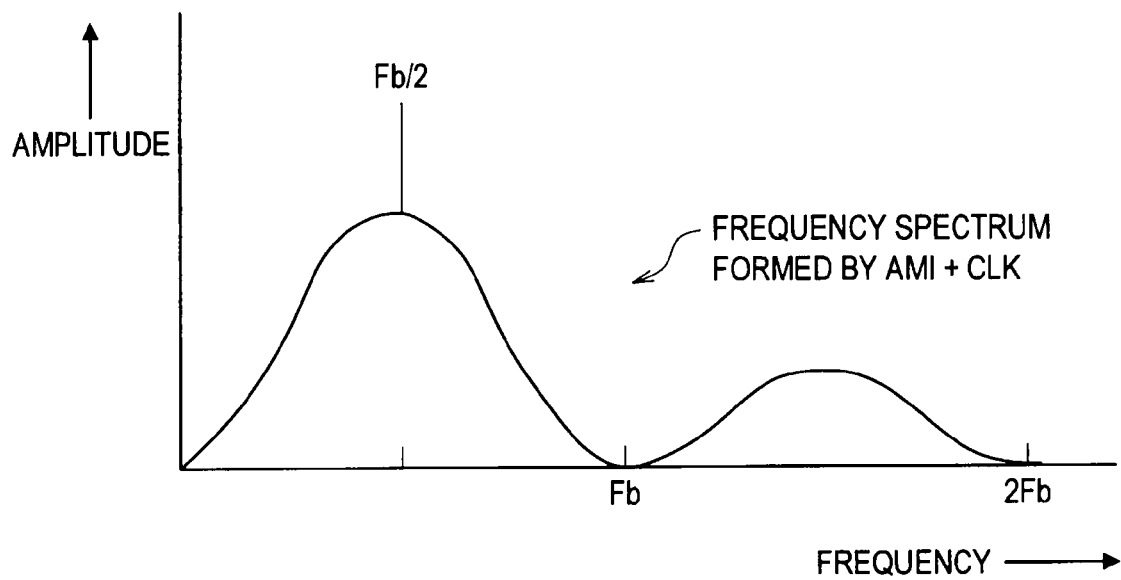
FIG. 11 is an explanatory figure that shows an example of a frequency spectrum for a signal according to the new method.

Next, a method for generating the encoded signal in the encoder 312 will be explained with reference to FIG. 10. FIG. 10 is an explanatory figure that shows an example of the encoding method according to the new method. Note that FIG. 10 illustrates a method of generating a code for which the AMI code serves as a base. However, the new method is not limited to using the AMI code as a base, and any code that has the same characteristics as the AMI code may also be used in the same manner. For example, a bipolar code, a code according to a partial response method, and the like can also be used.

The signal that is shown in (C) in FIG. 10 is a signal that has been encoded by the encoding method of the new method. In the signal, data values of 1 are expressed by a plurality of potentials A1 (−1, −3, 1, 3), and data values of zero are expressed by a plurality of potentials A2 (−2, 2) that are different from the potentials A1. Note that the signal is configured such that the polarities are inverted and is also configured such that the same potential does not occur consecutively. For example, referring to the portion where the zero data values occur consecutively in the bit intervals T6 to T9, the potentials are −2, 2, −2, and 2. Using this sort of code makes it possible for the clock component to be regenerated by detecting both the rising and the falling edges, even if the same data value occurs consecutively.

Because the encoder 312 generates a code like that described above, an adder ADD is provided. As shown in FIG. 10, the encoder 312 may take the serial signal that is input, encode it into the AMI code (A), for example, and input it to the adder ADD. The encoder 312 also generates a clock (B) that has a frequency (2/Fb) that is half of the transmission speed Fb of the AMI code and then inputs the clock to the adder ADD. Note that the clock amplitude is N times that of the AMI code (N>1; N=2 in the example in FIG. 10). The encoder 312 then generates the signal (C) by using the adder ADD to add the AMI code and the clock. At this time, the AMI code and the clock are synchronized, and their edges are aligned when they are added.

Refer once again to FIG. 9. The serial signal that has been encoded by the encoder 312 is input to the LVDS driver 156 and the driver 194. The LVDS driver 156 transmits the input serial signal to the deserializer 138 by a differential transmission method according to LVDS. For its part, the driver 194, using electromagnetic coupling by the coil 192, transmits the input serial signal to the signal reading device 200. Note that the configuring elements for transmitting the signal to the signal reading device 200 may be omitted as necessary according to the embodiment.

In contrast, the parallel signal clock that is input to the serializer 134 is input to the PLL 158. The PLL 158 generates a serial signal clock from the parallel signal clock and inputs it to the P/S conversion portion 152 and to the timing control portion 160. The timing control portion 160 controls the timing of the transmission of the serial signal by the encoder 312, based on the serial signal clock that is input.

Deserializer 138

As shown in FIG. 9, the deserializer 138 is mainly configured from the LVDS receiver 172, the S/P conversion portion 176, the timing control portion 182, a clock detection portion 332, and a decoder 334. The main point of difference from the mobile terminal 190 that was described earlier is in the clock detection portion 332, which does not have a PLL.

As shown in FIG. 9, the serial signal is transmitted from the serializer 134 to the deserializer 138 by the differential transmission method according to LVDS. The serial signal is received by the LVDS receiver 172. The serial signal that is received by the LVDS receiver 172 is input to the decoder 334 and to the clock detection portion 332. The decoder 334 detects the beginning portion of the data by referring to the header in the input serial signal and decodes the serial signal that was encoded by the encoding method that is used by the encoder 312.

Next, the method of decoding by the decoder 334 will be explained with reference to FIG. 10. As explained above, the serial signal is encoded by the encoder 312 into the form that is shown in (C) in FIG. 10. Accordingly, the decoder 334 can decode the original serial signal by determining whether the amplitude of the signal is A1 or A2.

Four threshold values (L1 to L4) that are shown in (C) in FIG. 10 are used to determine whether the amplitude is A1 (−1, −3, 1, 3), which corresponds to a data value of 1, or A2 (−2, 2), which corresponds to a data value zero. Accordingly, the decoder 334 compares the amplitude of the input serial signal to the four threshold values described above and determines whether the amplitude is A1 or A2, then decodes the original serial signal. The decoding processing will be described in detail at a later stage (refer to FIGS. 12 to 15).

Refer once again to FIG. 9. The serial signal that has been decoded by the decoder 334 is input to the S/P conversion portion 176. The S/P conversion portion 176 converts the input serial signal into the parallel signal (P-DATA). The parallel signal that has been converted by the S/P conversion portion 176 is output to the LCD 104.

For its part, the clock detection portion 332 detects the clock component in the input serial signal. As has already been explained, using the code that is shown in (C) in FIG. 10 makes it possible for the clock component to be detected based on the cycle of the polarity inversion, the polarity of the amplitude being determined by comparing the amplitude to a threshold value L0 (a potential of zero). Therefore, the clock detection portion 332 can detect the clock component of the signal without using a PLL. This makes it possible to reduce the amount of electric power that is consumed by the deserializer 138.

Refer once again to FIG. 9. The clock that is detected by the clock detection portion 332 is input to the decoder 334 and the timing control portion 182. The timing control portion 182 controls the receiving timing based on the clock that is input from the clock detection portion 332. The clock (P-CLK) that is input to the timing control portion 182 is output to the LCD 104.

Thus, using a code that does not contain a direct current component (refer to FIG. 11) and from which the clock component can be regenerated based on the polarity inversion cycle makes it possible to perform the clock detection without using a PLL, greatly reducing the amount of electric power that the mobile terminal consumes. Note that the frequency spectrum for the code that is used by the new method may take a form like that shown in FIG. 11, for example. A line spectrum is evident in the clock frequency Fb/2 that is added by the adder ADD of the encoder 312, in addition to which the broad frequency spectrum of the AMI code is also present. Note that in this frequency spectrum, null points exist at the frequencies Fb, 2 Fb, 3 Fb, and the like.

The technology according to the new method can also be applied to configurations like those in the mobile terminals 130, 190, and 230 and the signal reading device 200 that are described above. In other words, the technology can also be applied to an electronic device that uses a method of transmitting signals by one of the electric power line transmission method and electromagnetic coupling. If the new method were to be applied to these sorts of electronic devices, the PLL could be omitted from the deserializer 138 that is mounted in each of the devices.

Details of Decoding Processing

Figure 12:
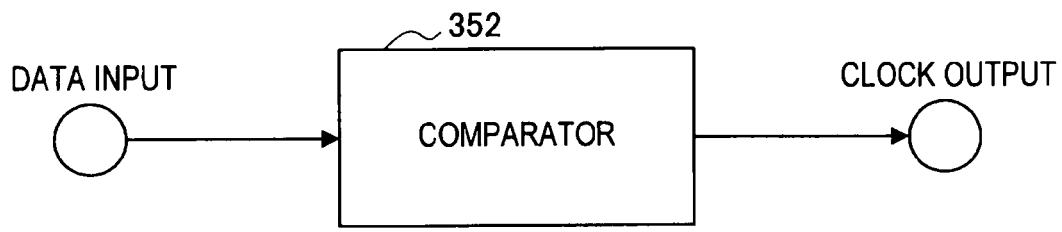
FIG. 12 is an explanatory figure that shows an example of a circuit configuration of a clock detection portion.
Figure 13:
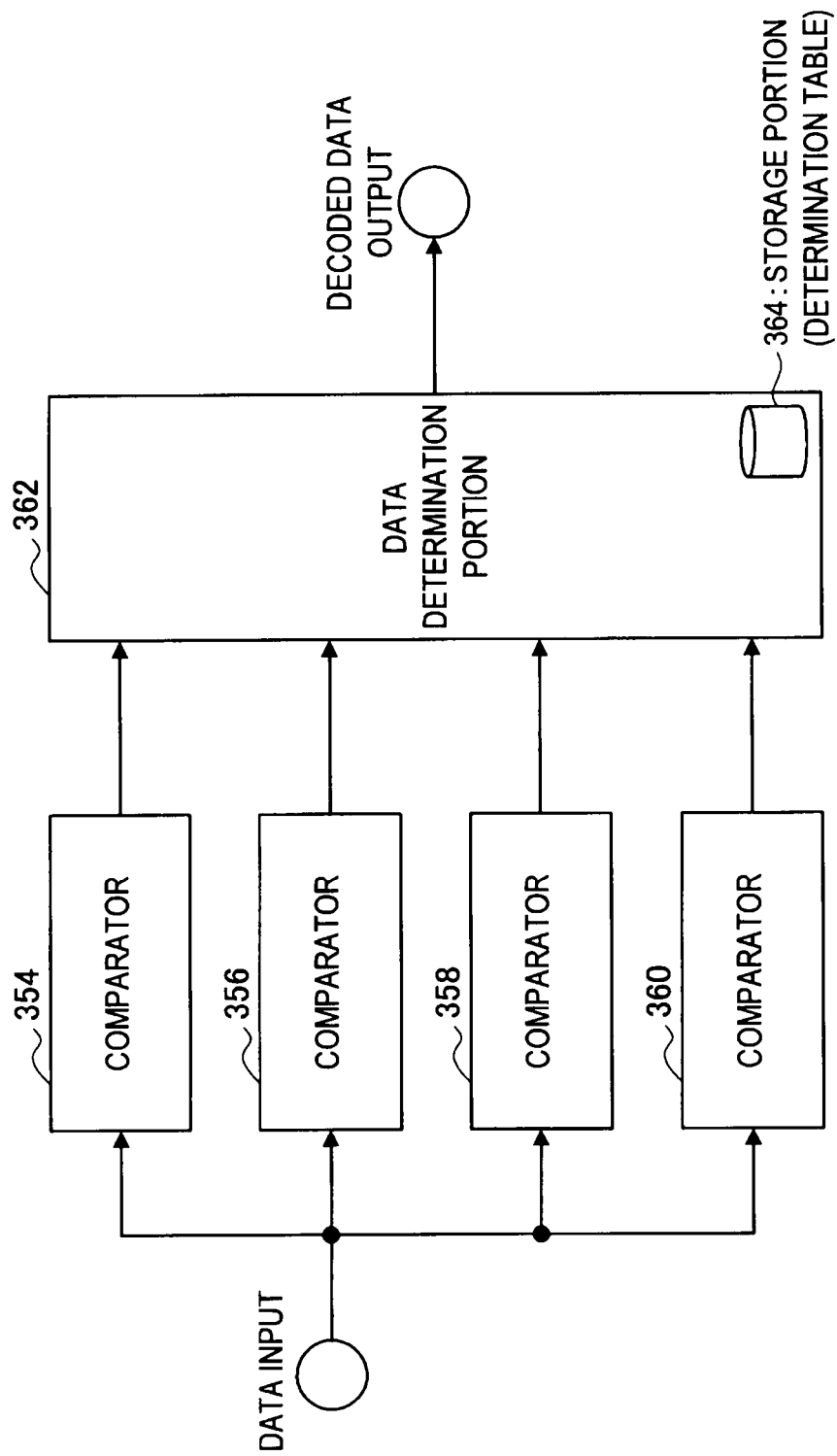
FIG. 13 is an explanatory figure that shows an example of a circuit configuration of a decoder.
Figure 15:
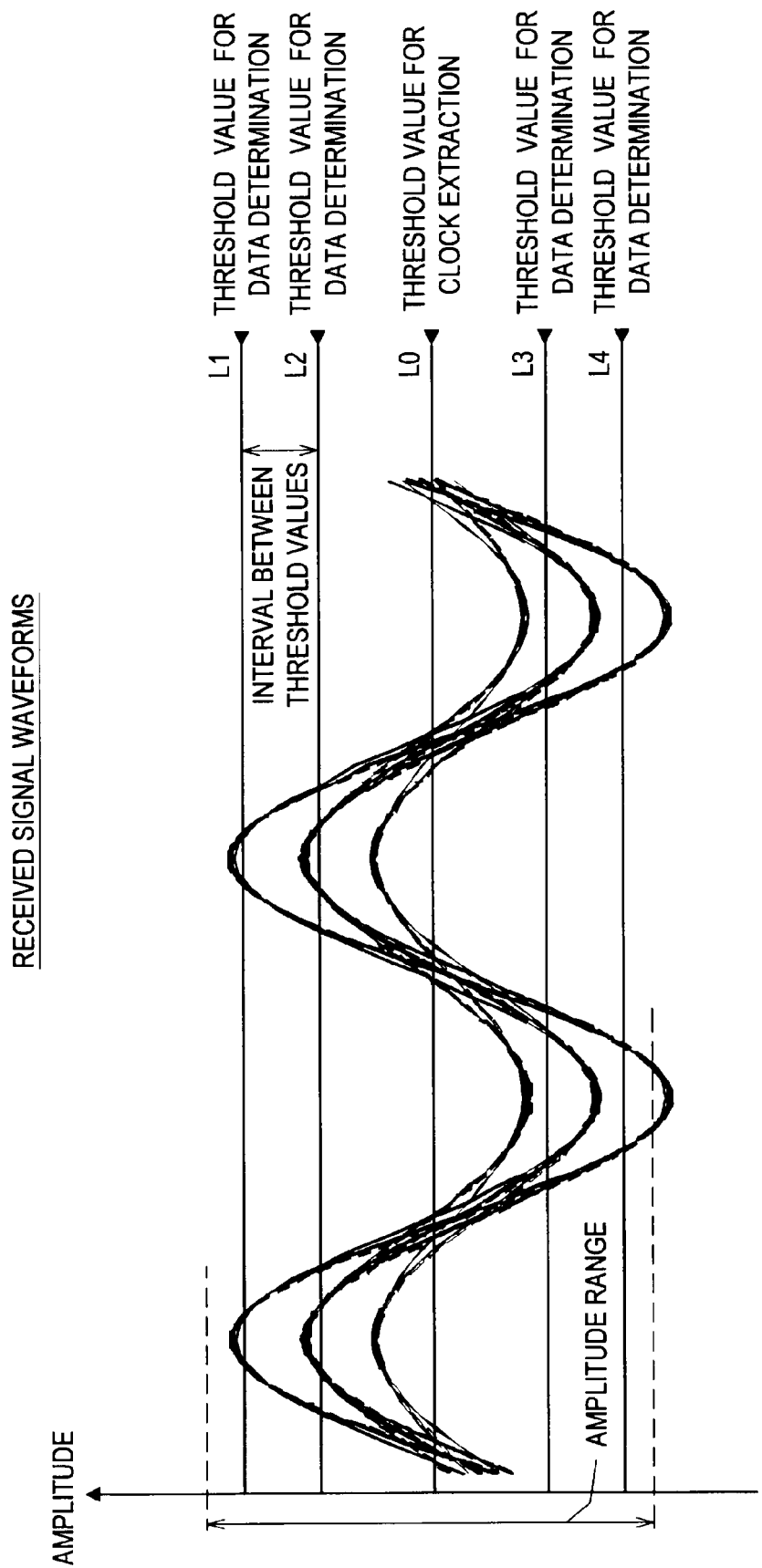
FIG. 15 is an explanatory figure that shows relationships between received signal waveforms and threshold values for data determination.

Next, the details of the decoding processing in the new method will be explained with reference to FIGS. 12 to 15. FIG. 12 is an explanatory figure that shows an example of a circuit configuration of the clock detection portion 332. FIG. 13 is an explanatory figure that shows an example of a circuit configuration of the decoder 334. FIG. 14 is an explanatory figure that shows an example of a configuration of a determination table for data determination. FIG. 15 is an explanatory figure that shows received signal waveforms (an eye pattern is shown in the drawing) in a case where the new method is used.

Example of Circuit Configuration of the Clock Detection Portion 332

First, refer to FIG. 12. As shown in FIG. 12, the function of the clock detection portion 332 is implemented in a comparator 352.

The amplitude values of the signal that has been encoded by the new method are input as input data to the comparator 352. Once the input data have been input, the comparator 352 compares the input amplitude values to a specified threshold value. For example, the comparator 352 may determine whether or not the input amplitude values are greater than the specified threshold value. The comparator 352 is provided to extract the clock based on the code of the new method (refer to (C) in FIG. 10). Therefore, the threshold value L0 is used as the specified threshold value.

For example, in a case where the input amplitude value is greater than the specified threshold value, the comparator 352 may output a determination value (for example, 1) that indicates that the input amplitude value is greater than the specified threshold value. On the other hand, in a case where the input amplitude value is less than the specified threshold value, the comparator 352 may output a determination value (for example, zero) that indicates that the input amplitude value is not greater than the specified threshold value. The results that are output by the comparator 352 are input as the clock to the decoder 334 and the timing control portion 182.

Example of Circuit Configuration of the Decoder 334

Next, refer to FIG. 13. As shown in FIG. 13, the function of the decoder 334 is implemented in a plurality of comparators 354, 356, 358, 360 and in a data determination portion 362. Further, a storage portion 364 is provided in the data determination portion 362. The determination table for data determination that is shown in FIG. 14 is stored in the storage portion 364.

A different threshold value is set for each of the plurality of comparators 354, 356, 358, 360. For example, the threshold value L1 may be set for the comparator 354, the threshold value L2 may be set for the comparator 356, the threshold value L3 may be set for the comparator 358, and the threshold value L4 may be set for the comparator 360. However, as shown in (C) in FIG. 10, the relationships among the threshold values L1 to L4 must satisfy the condition L1>L2>L3>L4.

First, the amplitude values of the signal that has been encoded by the new method are input as input data to the plurality of comparators 354, 356, 358, 360. At this time, the same input data are input in parallel to the plurality of comparators 354, 356, 358, 360.

Once the input data have been input, the comparator 354 compares the input amplitude values to the threshold value L1 and determines whether or not the input amplitude values are greater than the threshold value L1. In a case where the input amplitude value is greater than the threshold value L1, the comparator 354 outputs a determination value (for example, 1) that indicates that the input amplitude value is greater than the threshold value L1. On the other hand, in a case where the input amplitude value is less than the threshold value L1, the comparator 354 outputs a determination value (for example, zero) that indicates that the input amplitude value is not greater than the threshold value L1.

In the same manner, the comparator 356 compares the input amplitude values to the threshold value L2 and determines whether or not the input amplitude values are greater than the threshold value L2. The comparator 358 compares the input amplitude values to the threshold value L3 and determines whether or not the input amplitude values are greater than the threshold value L3. The comparator 360 compares the input amplitude values to the threshold value L4 and determines whether or not the input amplitude values are greater than the threshold value L4. The determination results that are output from the plurality of comparators 354, 356, 358, 360 are input to the data determination portion 362.

Based on the determination results that are output from the plurality of comparators 354, 356, 358, 360, the data determination portion 362 determines the bit values that are indicated by the input data. In this process, the data determination portion 362 refers to the determination table for data determination (refer to FIG. 14) that is stored in the storage portion 364 and based on the determination table, determines the bit values that are indicated by the input data.

The table that is shown in FIG. 14, for example, may be used as the determination table for data determination. As shown in the example in FIG. 14, in the determination table, a bit value (zero or 1) is associated with each combination of the values that are output from the plurality of comparators 354, 356, 358, 360.

Consider, for example, a case in which the output value from the comparator 354 is 1. In this case, the input amplitude value is greater than the threshold value L1. As explained above, the relationship among the threshold values is defined as L1>L2>L3>L4. Based on this relationship, the output values from the comparators 356, 358, 360 must also be 1. Referring to (C) in FIG. 10, the bit value that corresponds to the amplitude that has a value that is greater than the threshold value L1 is 1. Therefore, in the determination table, a bit value of 1 is associated with the combination in which all of the output values from the comparators 354, 356, 358, 360 are 1.

Consider other conditions as well. For the purposes of this discussion, the output values from the comparators 354, 356, 358, 360 are respectively called d1, d2, d3, d4, and the combination of the output values is expressed as (d1, d2, d3, d4). For example, if the combination (d1, d2, d3, d4) is (0, 1, 1, 1), it means that an input data value d satisfies the condition L1>d>L2. Referring to (C) in FIG. 10, in a case where the input data value d satisfies the condition L1>d>L2, the bit value is zero.

In the same manner, if the combination (d1, d2, d3, d4) is (0, 0, 1, 1), it means that the input data value d satisfies the condition L2>d>L3. Referring to (C) in FIG. 10, in a case where the input data value d satisfies the condition L2>d>L3, the bit value is 1. If the combination (d1, d2, d3, d4) is (0, 0, 0, 1), it means that the input data value d satisfies the condition L3>d>L4. Referring to (C) in FIG. 10, in a case where the input data value d satisfies the condition L3>d>L4, the bit value is zero. If the combination (d1, d2, d3, d4) is (0, 0, 0, 0), it means that the input data value d satisfies the condition L4>d. Referring to (C) in FIG. 10, in a case where the input data value d satisfies the condition L4>d, the bit value is 1.

Thus the combinations of the output values that are output individually from the comparators 354, 356, 358, 360 can be associated with specific bit values, and the determination table that is shown in FIG. 14 is an example of the correspondence relationships between the combinations and the bit values, summarized in the form of a table. The data determination portion 362 refers to this sort of determination table and determines the bit values based on the combinations of the output values that are output from the plurality of comparators 354, 356, 358, 360. The bit values that are determined by the data determination portion 362 are input to the S/P conversion portion 176.

Summary of Issues 2

Thus, in order to decode the code for the new method, an example of which is shown in (C) in FIG. 10, both the one comparator 352 that configures the clock detection portion 332 and the four comparators 354, 356, 358, 360 that configure the decoder 334 are necessary. The code that is used in the new method provides specific advantages in that it does not contain a direct current component and makes it possible for the clock to be regenerated without using a PLL. However, a total of five comparators are necessary in order to determine the two bit values. This enlarges the scale of the circuitry and increases the amount of electric power that is consumed.

Furthermore, the processing to determine the data is performed by comparing the amplitude values to the five threshold values, so in a case where the maximum variation in the signal amplitude (the amplitude range) is fixed, the intervals between the threshold values become small, as shown in FIG. 15. This makes it necessary both to set the threshold values very precisely and to determine the bit values with high precision.

In recent years, the miniaturization of semiconductor processes has advanced, and operating voltages have decreased. In conjunction with this trend, the amplitude ranges of signals have become smaller. When a code is used in which a plurality of bit values assigned to the same polarity, the maximum value and the minimum value of the signal amplitude must both fit within the range of the lower operating voltages. Under these circumstances, if the processing to determine the data is performed by comparing the amplitude values to the five threshold values, the threshold values must be set with extremely high precision, which is not very realistic.

Addressing these technological issues, the embodiment that will be described below reduces the number of comparators (the number of threshold values) that are used in decoding the code according to the new method, thus reducing the scale of the circuitry and making the precision with which the threshold values must be set less stringent. The embodiment that will be described below also seeks to eliminate the need to adjust the threshold values. Of course, the embodiment that will be explained below also resolves the issues that were described earlier (in the Summary of issues 1). The embodiment that makes it possible to achieve these objectives will be explained below.

Embodiment

The embodiment of the present invention will be explained. The present embodiment pertains to a technology that improves the configuration of the decoder 334 in the mobile terminal 300 that is described above and that reduces the number of amplitude values that must be determined. In particular, in the present embodiment, an improved form of the decoder 334 (hereinafter called the decoder 334') is proposed that establishes in advance, without adjustment, the threshold values that are used in determining the bit values.

Functional Configuration

A functional configuration of the decoder 334' according to the present embodiment will be explained below with reference to FIG. 16. FIG. 16 is an explanatory figure that shows an example of the functional configuration of the decoder 334' according to the present embodiment. Note that the code for the new method that is shown in (C) in FIG. 10 is input to the decoder 334' from the LVDS receiver 172, and the clock signal is put to the decoder 334' from the clock detection portion 332, as shown in FIG. 9.

Figure 16:
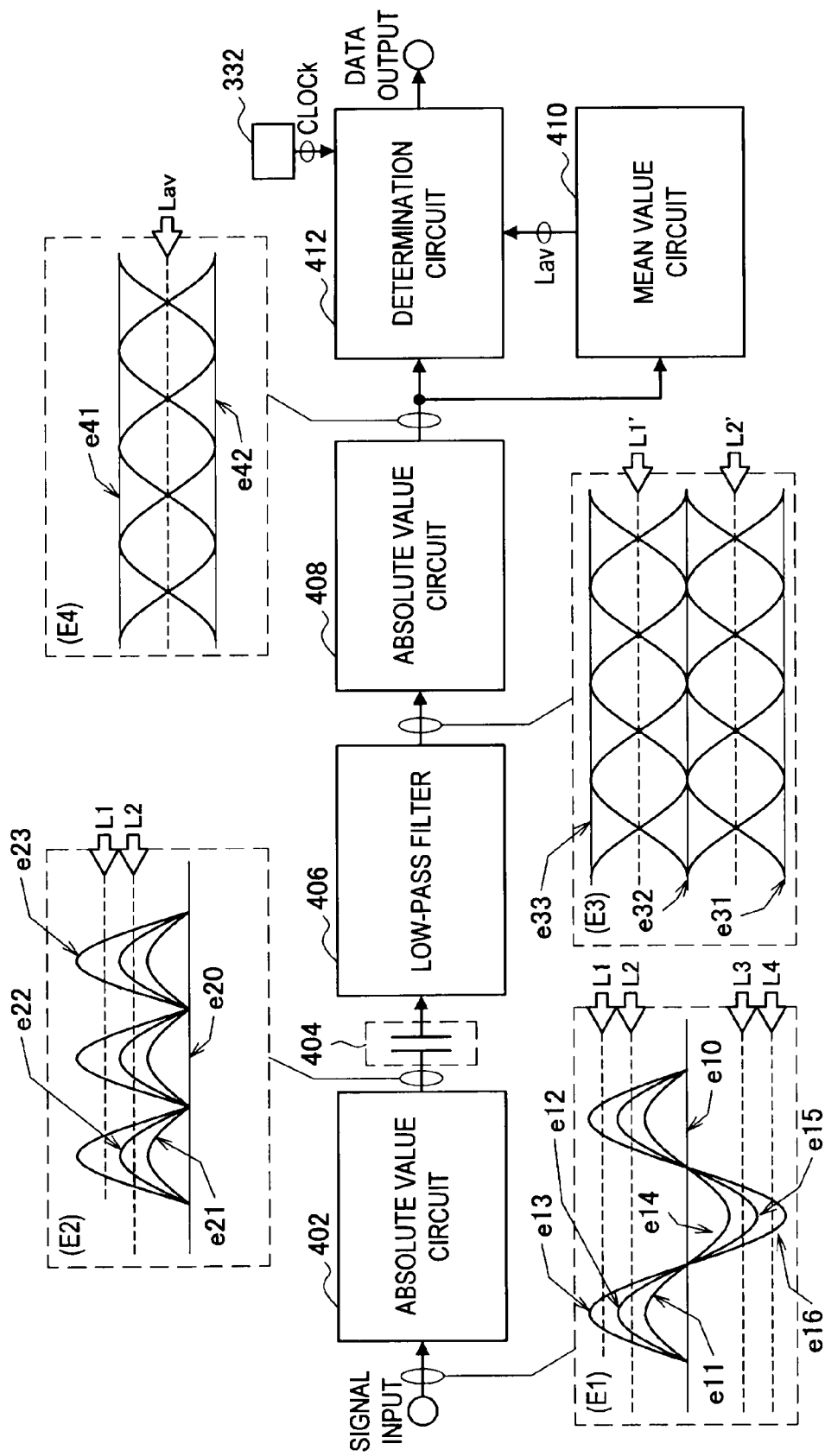
FIG. 16 is an explanatory figure that shows an example of a functional configuration of a decoder according to an embodiment of the present invention.

As shown in FIG. 16, the decoder 334' includes absolute value circuits 402, 408, a capacitor 404, a low-pass filter 406, a mean value circuit 410, and determination circuit 412. A signal waveform at a stage prior to the absolute value circuit 402 (E1), a signal waveform at a stage prior to the capacitor 404 (E2), a signal waveform at a stage prior to the absolute value circuit 408 (E3), and a signal waveform at a stage prior to the determination circuit 412 (E4) are also illustrated in FIG. 16.

First, the signal that is input from the LVDS receiver 172 is input to the absolute value circuit 402. The signal waveform at the stage prior to the absolute value circuit 402 forms an eye pattern that is indicated by (E1). The eye pattern (E1) includes six amplitudes (e11, e12, e13, e14, e15, e16). It can be seen from the code formation process that is shown in (C) in FIG. 10 that the amplitudes e11, e13, e14, e16 should all be determined to have a bit value of 1. On the other hand, the amplitudes e12, e15 should be determined to have a bit value of zero.

In other words, at the stage of the eye pattern (E1), four amplitudes (e11, e13, e15, e16) are used to express the bit value 1. Two amplitudes (e12, e15) are used to express the bit value zero. Under these circumstances, four threshold values (threshold values for bit determination), as shown in FIG. 15, are necessary in order to determine the individual bit values. The intervals between the threshold values therefore become small, and a high degree of setting precision is required when the threshold values are set. In addition, as shown in FIG. 13, the four comparators 354, 356, 358, 360 are necessary in order to perform the data determination processing.

However, the amplitudes (e11, e14), the amplitudes (e12, e15), and the amplitudes (e13, e16) respectively have polarities that are the inverse of one another. Moreover, each of the amplitudes in each pair represents the same bit value. In light of this characteristic, it is possible to reduce the number of amplitudes that must be determined. In the present embodiment, first, the absolute value circuit 402 converts the amplitudes into absolute values. The eye pattern of the signal that has been converted into absolute values by the absolute value circuit 402 becomes like (E2). The conversion into absolute values by the absolute value circuit 402 causes the amplitudes e14, e15, e16 that have negative polarities to be flipped over into the positive polarity region on the other side of the ground e10.

In other words, the absolute value circuit 402 converts the amplitude e14 into an amplitude e21 (that is equal to e11), converts the amplitude e15 into an amplitude e22 (that is equal to e12), and converts the amplitude e16 into an amplitude e23 (that is equal to e13), with all of the resulting amplitudes having positive polarities. This has the effect of reducing from six to three the number of amplitudes that must be determined. Even at this stage, it is possible to determine every bit value using two threshold values (L1, L2). However, as can be seen from the eye pattern (E2), the intervals between the threshold values remain as small as ever. Therefore, the number of threshold values has been reduced, but high precision is still required in the setting of the threshold values.

Accordingly, the direct current component in the signal with the eye pattern (E2) is removed by passing the signal through the capacitor 404, and then the high-frequency component is removed by passing the signal through the low-pass filter 406. Note that the cutoff frequency Fc of the low-pass filter 406 is set such that it is greater than Fb/4 and less than Fb/2. The eye pattern of the signal that has been passed through the low-pass filter 406 becomes like (E3). The eye pattern (E3) includes three levels (e31, e32, e33). The three levels e31, e32, e33 respectively correspond to the amplitudes e21, e22, e23 in the eye pattern (E2).

Therefore, the levels e31, e33 express the bit value 1, and the level e32 expresses the bit value zero. The bit values may also be determined at this stage. For example, as shown in FIG. 16, the bit values can be determined by setting threshold values L1', L2' and comparing the three levels to these threshold values. However, the single bit value 1 is still expressed by two levels. Moreover, two threshold values, L1' and L2', must be set. Note, however, that the eye pattern (E3) has a symmetrical form with the ground level e32 as its axis of symmetry. Another conversion into absolute values may therefore be considered.

The signal with the eye pattern (E3) is converted into absolute values by the absolute value circuit 408. The eye pattern of the signal that has been converted into absolute values by the absolute value circuit 408 becomes like (E4). Passing the signal through the absolute value circuit 408 causes the portion of the signal with the eye pattern (E3) that is lower than the ground level e32 to be flipped over into the positive region on the upper side of the ground level e32. The existing three levels are therefore reduced to two. A level e41 in the eye pattern (E4) corresponds to the levels e31, e33 in the eye pattern (E3). A level e42 in the eye pattern (E4) corresponds to the ground level e32 in the eye pattern (E3).

Accordingly, the level e41 expresses the bit value 1, and the level e42 expresses the bit value zero. The signal with the eye pattern (E4) is input to the mean value circuit 410 and the determination circuit 412. In the mean value circuit 410, a mean level Lav is computed by taking the average of the values of the two levels e41, e42 that are indicated by the eye pattern (E4). The mean level Lav that is computed by the mean value circuit 410 is input to the determination circuit 412. Because the mean level Lav, which serves as a threshold value, is computed by processing that averages the signal levels, the threshold value does not need to be adjusted.

The determination circuit 412 determines the bit values using the mean level Lav that has been input from the mean value circuit 410. In a case where the level of the input signal is higher than the mean level Lav, the determination circuit 412 outputs the bit value 1, and in a case where the input level is lower than the mean level Lav, the determination circuit 412 outputs the bit value zero. The determination circuit 412 also takes the bit values that have been produced by this determination processing and outputs them as decoded data in synchronization with the clock signal that is input from the clock detection portion 332.

Example of Circuit Configuration of the Absolute Value Circuits 402, 408

Figure 17:
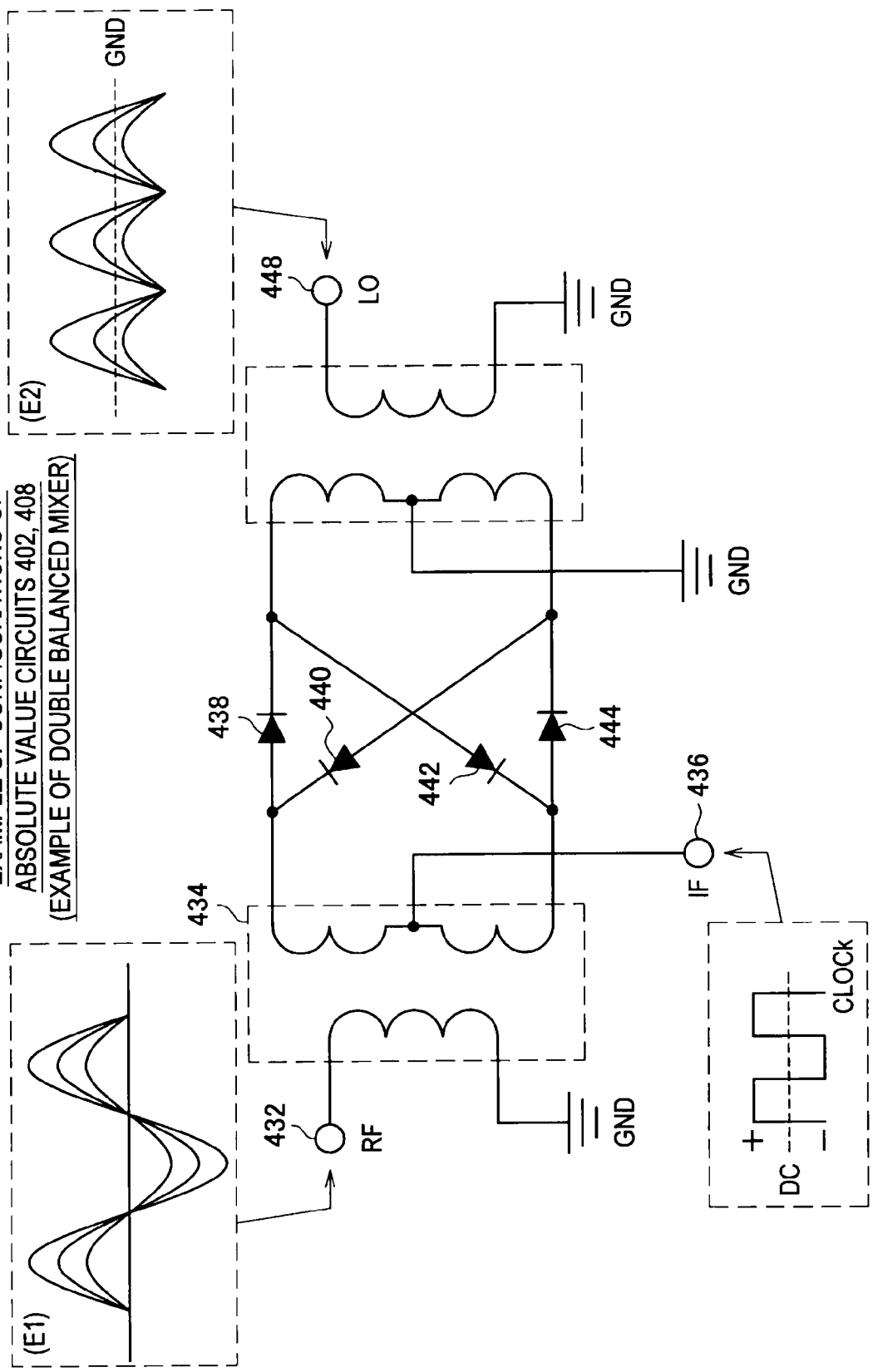
FIG. 17 is an explanatory figure that shows an example of a configuration of an absolute value circuit according to the present embodiment.

Next, a circuit configuration of the absolute value circuit 402 that is described above will be explained with reference to FIG. 17 using a specific example. FIG. 17 is an explanatory figure that shows a specific example of the configuration of the absolute value circuit 402 (in a case where a double balanced mixer is used). Note that the circuit configuration of the absolute value circuit 402 according to the present embodiment is not limited to this example. Moreover, the function of the absolute value circuit 408 can also be implemented by the same circuit configuration as that shown in FIG. 17.

As shown in FIG. 17, each of the absolute value circuits 402, 408 is configured from an RF port 432, transformers 434, 446, an IF port 436, diodes 438, 440, 442, 444, and an LO port 448.

The signal with the eye pattern (E1) is input to the RF port 432. In addition, the clock signal that has been detected by the clock detection portion 332 is input to the IF port 436 in synchronization with the signal with the eye pattern (E1). Note that the clock signal that is input to the IF port 436 is input at a level that turns on the diodes 438, 440, 442, 444.

In a case where the clock signal that is input to the IF port 436 has shifted to the positive direction and reached a voltage that turns on the diodes 438, 440, 442, 444, the diodes 438, 444 turn on, and the diodes 440, 442 turn off. This causes the signal that has been input to the RF port 432 to be output in the same phase to the LO port 448, even as it is damped by the transformers 434, 446 and the diodes 438, 440, 442, 444.

Conversely, in a case where the clock signal that is input to the IF port 436 has shifted to the negative direction and the absolute value of the signal has reached a voltage that turns on the diodes 438, 440, 442, 444, the diodes 440, 442 turn on, and the diodes 438, 444 turn off. This causes the signal that has been input to the RF port 432 to be output in the opposite phase to the LO port 448, even as it is damped by the transformers 434, 446 and the diodes 438, 440, 442, 444.

Thus, if the voltage of the clock signal that is input from the IF port 436 is negative when the amplitude of the signal that is input to the RF port 432 is negative, the phase of the signal is inverted, so the absolute value circuit comes into effect. Note that in the example in FIG. 17, because the LO port 448 is connected, the direct current component is removed from the signal that is output from the LO port 448. This causes the ground level to assume the position of the mean level.

As explained above, the absolute value circuit 402 (and the absolute value circuit 408) can be implemented by using a double balanced mixer. Note that the double balanced mixer is a multiplier, and what the circuit that is described above does is equivalent to multiplying the input signal and the clock signal in synchronization with one another. In other words, the absolute value circuits 402, 408 can be implemented by a circuit configuration that multiplies the input signal and the clock signal in synchronization with one another. For example, the functions of the absolute value circuits 402, 408 can also be implemented by a circuit configuration that multiplies the input signal and the clock signal using a multiplier that uses a Gilbert cell. Incidentally, in the example that is described above, an absolute value circuit that has three ports is used, but it is also possible to implement the functions of the absolute value circuits 402, 408 using diodes and an operational amplifier that has two ports. Evan a modification of this sort is included within the technological scope of the present embodiment.

Example of Circuit Configuration of the Mean Value Circuit 410

Figure 18:
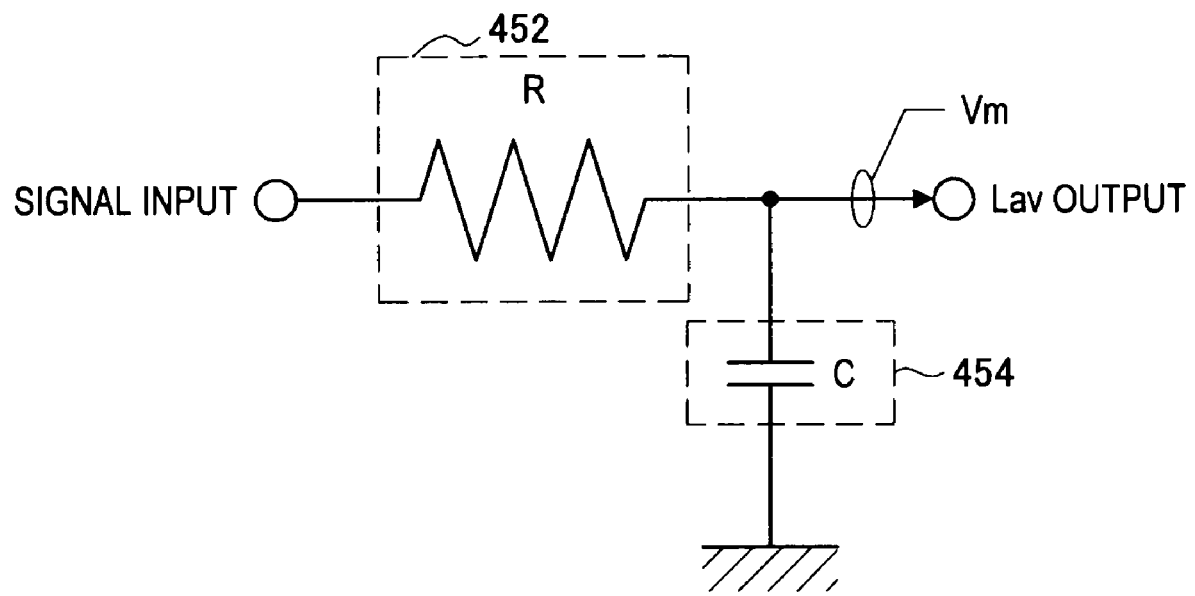
FIG. 18 is an explanatory figure that shows an example of a configuration of a mean value circuit according to the present embodiment.

Next, an example of a circuit configuration of the mean value circuit 410 that is described above will be briefly explained with reference to FIG. 18. FIG. 18 is an explanatory figure that shows an example of the circuit configuration of the mean value circuit 410 that is described above. FIG. 18 shows a mean value circuit that is configured from a resistor 452 (R) and a capacitor 454 (C). When the signal with the eye pattern (E4) is input from an input terminal, the two levels e41, e42 are averaged by the resistor 452 and the capacitor 454, and a voltage Vm is output from an output terminal. In other words the mean value circuit 410 outputs the voltage Vm as the mean level Lav. As explained above, the mean level Lav is used as a threshold value by the determination circuit 412. Providing the mean value circuit 410 in this form makes it possible to eliminate the need to adjust the threshold value.

Frequency Spectrum Shifts

Figure 19:
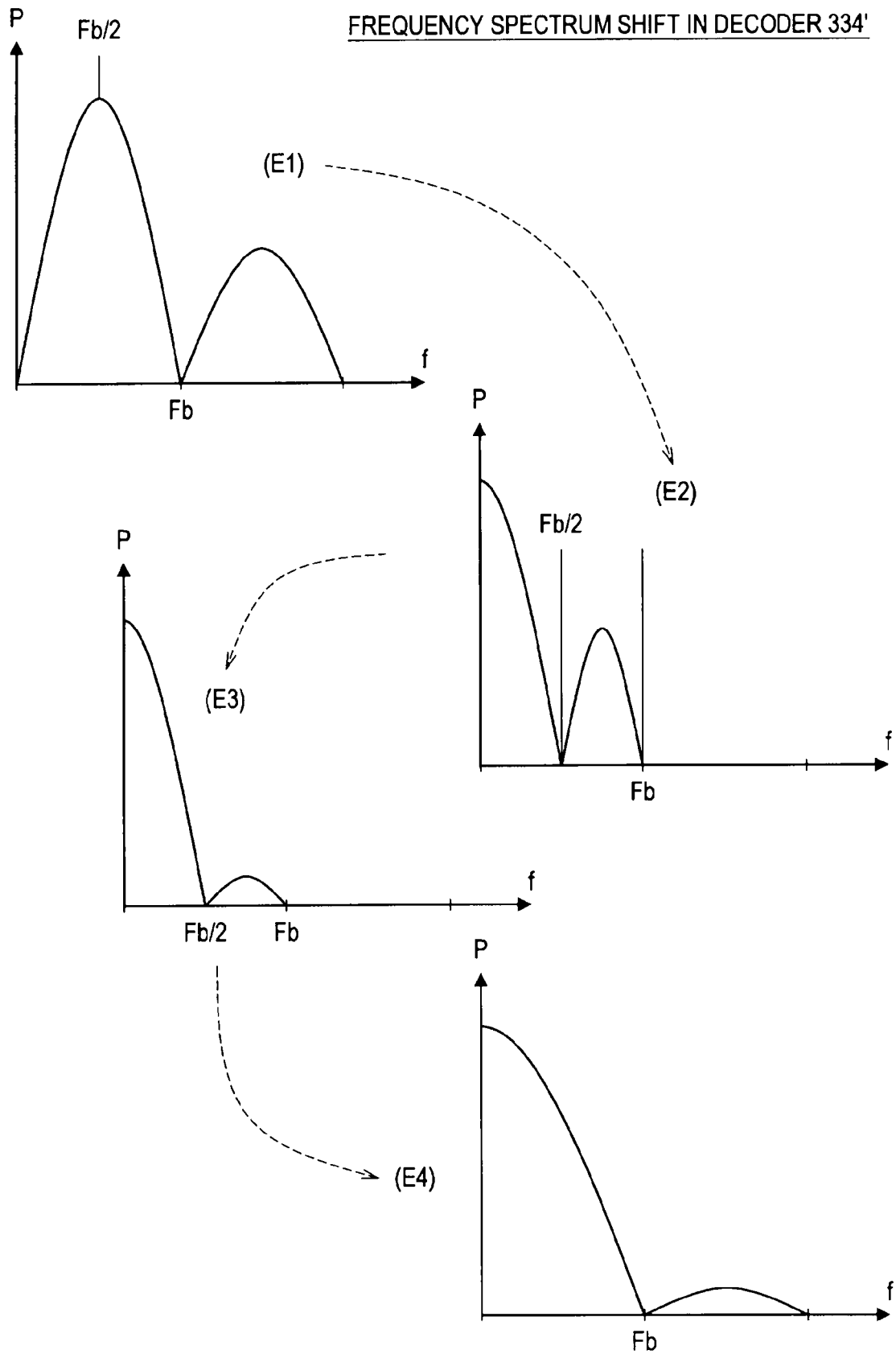
FIG. 19 is an explanatory figure that shows spectrum shifts that are produced in the course of signal processing according to the present embodiment.

Next, the frequency spectra that correspond to the eye patterns (E1) to (E4) that are shown in FIG. 16 will be briefly explained with reference to FIG. 19. FIG. 19 is an explanatory figure that shows the frequency spectra for the eye patterns (E1) to (E4) that are shown in FIG. 16. Note that the frequency spectra in FIG. 19 are drawn so as to illustrate schematically the characteristics of the spectra.

First, referring to the frequency spectrum that corresponds to the eye pattern (E1), it can be seen that the direct current component is not included in the frequency spectrum. Further, a line spectrum that is equivalent to the frequency spectrum of the clock signal exists in the position of the frequency Fb/2. These characteristics have already been explained with reference to FIG. 11.

Next, refer to the frequency spectrum that corresponds to the eye pattern (E2). The signal with the eye pattern (E2) is the result of the conversion of the signal with the eye pattern (E1) into absolute values. Therefore, in the frequency spectrum that corresponds to the eye pattern (E2), although the direct current component is generated, the frequency band is compressed to half of what it was. In addition, the conversion into absolute values causes a line spectrum to occur in the position of Fb, which is two times the frequency component.

Next, refer to the frequency spectrum that corresponds to the eye pattern (E3). The signal with the eye pattern (E3) is the signal that is produced by passing the signal with the eye pattern (E2) through the capacitor 404 and the low-pass filter 406. In other words, it is the signal in which the direct current component has been removed from the signal with the eye pattern (E2) and the high-frequency component has also been removed. Therefore, the frequency spectrum that corresponds to the eye pattern (E3) is one in which line spectra do not exist in the positions of the frequencies Fb/2 and Fb and the high-frequency component has been damped.

Next, refer to the frequency spectrum that corresponds to the eye pattern (E4). The signal with the eye pattern (E4) is the result of the conversion of the signal with the eye pattern (E3) into absolute values. The conversion into absolute values turns the signal that corresponds to the eye pattern (E4) into an NRZ signal. Therefore, the frequency spectrum that corresponds to the eye pattern (E4) is the NRZ frequency spectrum. Moreover, the frequency band for the frequency spectrum that corresponds to the eye pattern (E4) is doubled.

An example of the functional configuration and the signal processing method of the decoder 334' according to the present embodiment, examples of the circuit configurations of the absolute value circuits 402, 408 and the mean value circuit 410 that are included in the decoder 334', and the frequency spectrum shifts have been explained. Because the signal is transmitted using the code for the new method that is shown in (C) in FIG. 10, as described above, it is possible to transmit the signal over a single coaxial cable by superposing it on the direct current power supply or the like. It is also no necessary to provide a PLL on the deserializer 138 side. Furthermore, when the signal that has been encoded by the new method is decoded, the threshold values can be set such that they do not need to be adjusted.

Summary

In closing, the functional configuration of the mobile terminal according to the present embodiment and the operational effects that are provided by the functional configuration will be briefly summarized. The mobile terminal includes a first information processing module that is equivalent to the operation portion 108 and a second information processing module that is equivalent to the display portion 102.

The first information processing module includes a function that transmits a signal in which input data that contains first and second bit values that differ from one another is encoded such that the first bit value is expressed by a plurality of first amplitude values and the second bit value is expressed by a plurality of second amplitude values that differ from the first amplitude values. The input data is also encoded such that the same amplitude value does not occur twice in succession and such that the polarities of the amplitude values are inverted with each cycle.

The second information processing module includes a signal receiving portion, an absolute value conversion portion, and an input data decoding portion. The signal receiving portion receives from the first information processing module the signal in which the input data that contains the first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle. The absolute value conversion portion converts the amplitude values in the signal that has been received by the signal receiving portion into absolute values. The input data decoding portion decodes the input data by determining the first and second bit values based on the amplitude values in the signal that have been converted into absolute values by the absolute value conversion portion.

Note that the LVDS receiver 172 that is described above is an example of the signal receiving portion. Note also that the decoder 334' is an example of the absolute value conversion portion and the input data decoding portion.

As described above, the signal that is received by the signal receiving portion has been encoded such that each of the bit values is expressed by a plurality of amplitude values. Therefore, in order to determine each of the bit values, it is necessary to determine each of the amplitude values using a plurality of threshold values. However, the second information processing module can use the absolute value conversion portion to convert the amplitude values in the received signal into absolute values. Because identical bit values are originally allocated to amplitude values that have the same magnitude but whose polarities differ, the determination result yields the same bit value even if the amplitude values are converted into absolute values before the determination is made. Furthermore, the absolute value conversion makes all of the amplitude values positive, so the number of amplitude values that express any one bit value is reduced. This makes it possible to reduce the number of the threshold values that are used in determining each of the bit values, which in turn makes it possible to reduce the number of the comparators that are used in the processing that determines the bit values. These changes produce the effects of reducing the amount of electric power that is consumed and reducing the scale of the circuitry.

The absolute value conversion portion may also be configured such that it includes first and second absolute value circuits, a direct current suppression circuit, and a low-pass filter. Note that the first absolute value circuit converts to absolute values the amplitude values of the signal that is received by the signal receiving portion. The direct current suppression circuit suppresses the direct current component in the signal that is output from the first absolute value circuit. The low-pass filter then suppresses the high-frequency component in the signal that is output from the direct current suppression circuit. Finally, the second absolute value circuit converts to absolute values the amplitude values of the signal that is output from the low-pass filter. This sort of configuration makes it possible for the received signal to be binarized and for the bit values to be determined using one threshold value.

Note that the absolute value circuit 402 that is described above is an example of the first absolute value circuit. The capacitor 404 that is described above is an example of the direct current suppression circuit. The low-pass filter 406 that is described above is an example of the low-pass filter. The absolute value circuit 408 that is described above is an example of the second absolute value circuit.

The second information processing module may also be provided with a mean value computation portion that computes a mean amplitude value by computing the average of two amplitude values of the signal that is output from the second absolute value circuit. In this case, the input data decoding portion determines the first and second bit values by comparing the amplitude values of the signal that is output from the second absolute value circuit to the mean amplitude value that has been computed by the mean value computation portion. Note that the mean value circuit 410 that is described above is an example of the mean value computation portion.

As described above, the signal that is output from the second absolute value circuit has already been binarized. Therefore, the mean value of the two amplitude values is the median value of the signal amplitude. Therefore, setting the threshold value to the median value and comparing the amplitude values to the threshold value makes it possible to determine the bit values. Establishing this sort of configuration makes it possible to eliminate the need to adjust the threshold value, because the threshold value, rather than being set in advance, is set automatically by the mean value computation portion.

The second information processing module may also be provided with a clock signal extraction portion that extracts the clock signal by detecting the polarity inversions in the signal that is received by the signal receiving portion. In this case, the first absolute value circuit converts the amplitude values in the signal into absolute values by synchronizing the signal that has been received by the signal receiving portion to the clock signal that has been extracted by the clock signal extraction portion, then multiplying the amplitude values in the signal by the amplitude values in the clock signal. The second absolute value circuit takes the signal that has been output from the low-pass filter and converts the amplitude values in the signal into absolute values by synchronizing the signal that has been output from the low-pass filter to the clock signal that has been extracted by the clock signal extraction portion, then multiplying the amplitude values in the signal by the amplitude values in the clock signal. Note that the clock detection portion 332 that is described above is an example of the clock signal extraction portion.

As has already been explained, the conversion of the input signal into absolute values can be implemented by multiplying the input signal and the clock signal. However, it is necessary to synchronize the input signal and the clock signal. If both signals are synchronized, multiplying both signals will always make the polarities positive, because the clock signal is negative when the input signal is negative. In other words, the multiplying converts the signals into absolute values. Note that in the present embodiment, this conversion to absolute values is implemented using the clock signal that is extracted from the received signal. Therefore, in a case where the processing to convert the signal into absolute values is added, it can be done without providing a PLL in the second information processing module.

Each of the first and second absolute value circuits may also be configured from a double balanced mixer that converts the input signal into absolute values by using the clock signal that has been extracted by the clock signal extraction portion. As described above, the conversion of the input signal into absolute values can be implemented by multiplying the input signal and the clock signal. As also described above, the conversion of the input signal into absolute values can also be implemented in the same manner by using a double balanced mixer that is configured such that the phase of the input signal is inverted in synchronization with the clock signal.

[Hardware Configuration]

The functions of the constituent elements held by the terminal can be realized by an information processing apparatus having, for example, a hardware configuration shown in FIG. 20. FIG. 20 is a diagram for explaining a hardware configuration of an information processing apparatus which can realize the functions held by the constituent elements of the apparatus.

Note that the forms that the information processing device may take include, for example, a portable information terminal, such as a personal computer, a mobile telephone, a Personal Handyphone System (PHS), a personal digital assistant (PDA), or the like, as well as a game device, various types of smart household appliances, and the like.

As shown in FIG. 20, the information processing apparatus mainly includes a CPU (Central Processing Unit) 902, a ROM (Read Only Memory) 904, a RAM (Random Access Memory) 906, a Host bus 908, a bridge 910, an external bus 912, an interface 914, an input unit 916, an output unit 918, a storage unit 920, a drive 922, a connection port 924, and a communication unit 926.

The CPU 902 functions as an arithmetic processing unit or a control unit and controls an entire operation of the constituent elements or some of the constituent elements on the basis of various programs recorded on the ROM 904, the RAM 906, the storage unit 920, or the removal recording medium 928. The ROM 904 stores, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program. These constituent elements are connected to each other by, for example, the host bus 908 which can perform high-speed data transmission. The host bus 908, for example, is connected to the external bus 912 in which a data transmission speed is relatively low through the bridge 910.

The input unit 916 is, for example, an operation unit such as a mouse, a keyboard, a touch panel, button, a switch, or a lever. The input unit 916 may be a remote control unit (so-called remote) that can transmit a control signal by using an infrared ray or other radio waves. The input unit 916 includes an input control circuit or the like to transmit information input by using the operation unit to the CPU 902 through an input signal.

The output unit 918 is, for example, a display device such as a CRT (Cathode Ray Tube), an LCD (Liquid Crystal Display), a PDP (Plasma Display Panel), or an ELD (Electro-Luminescence Display), an audio output device such as a loudspeaker or headphones, a printer, a mobile phone, or a facsimile that can visually or auditorily notify a user of acquired information.

The storage unit 920 is a device to store various data, and includes, for example, a magnetic storage device such as a hard disk drive (HDD; Hard Disk Drive), a semiconductor storage device, an optical storage device, or a magnetooptical storage device, or the like.

The drive 922 is a device that reads information recorded on the removal recording medium 928 such as a magnetic disk, an optical disk, a magnetooptical disk, or a semiconductor memory or writes information in the removal recording medium 928. The removal recording medium 928 is, for example, a DVD medium, a Blue-ray medium, an HD-DVD medium, a compact flash (CF; compactFlash) (registered trademark), a memorystick, or an SD memory card (Secure Digital memory card), or the like. As a matter of course, the removal recording medium 928 may be, for example, an IC card (Integrated Circuit Card) on which a non-contact IC chip is mounted, an electronic device, or the like.

The connection port 924 is a port such as an USB (Universal Serial Bus) port, an IEEE1394 port, an SCSI (Small Computer System Interface), an RS-232C port, or an optical audio terminal to which the external connection device 930 is connected. The external connection device 930 is, for example, a printer, a mobile music player, a digital camera, a digital video camera, an IC recorder, or the like.

The communication unit 926 is a communication device to be connected to a network 932. For example, a communication card for a wired or wireless LAN (Local Area Network), Bluetooth (registered trademark), or WUSB (Wireless USB), an optical communication router, an ADSL (Asymmetric Digital Subscriber Line) router, various communication modems, or the like is used. The network 932 connected to the communication unit 926 includes a wiredly or wirelessly connected network. For example, the Internet, a home-use LAN, infrared communication, broadcasting, satellite communication, or the like is used.

It should be understood by those skilled in the art that various modifications, combinations, sub-combinations and alterations may occur depending on design requirements and other factors insofar as they are within the scope of the appended claims or the equivalents thereof.

For example, the embodiment that is described above was explained using the AMI code as an example of the code that is input to the adder ADD, but the technology of the present invention is not limited to this example. As has already been described, various types of bipolar codes and codes according to partial response methods, such as PR (1, −1), PR (1, 0, −1), PR (1, 0, . . . , 0, −1), and the like, are also used. It is preferable to use a code format that utilizes polarity inversion, as these examples do. These sorts of codes can be generated by bit shifting and the like. Any number of modified examples of this sort of code generation method can be envisioned.

The present application contains subjected matter related to that disclosed in Japanese Priority Patent Application JP 2008-198396 filed in the Japan Patent Office on Jul. 31, 2008, the entire contents of which is hereby incorporated by reference.

What is claimed is:

1. An information processing device, comprising:
a signal receiving portion that receives a signal in the form of an eye pattern in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that a same amplitude value does not occur twice in succession and such that polarities of the first amplitude values and the second amplitude values are inverted with each cycle;
an absolute value conversion portion that converts into absolute values the amplitude values of the signal that has been received by the signal receiving portion; and
an input data decoding portion that decodes the input data by determining the first and second bit values based on the amplitude values in the signal that have been converted into absolute values by the absolute value conversion portion.

2. The information processing device according to claim 1, wherein the absolute value conversion portion includes a first absolute value circuit that converts into absolute values the amplitude values of the signal that has been received by the signal receiving portion, a direct current suppression circuit that suppresses a direct current component in a signal that has been output from the first absolute value circuit, a low-pass filter that suppresses a high-frequency component in a signal that has been output from the direct current suppression circuit, and a second absolute value circuit that converts amplitude values of a signal that has been output from the low-pass filter into absolute values.

3. The information processing device according to claim 2, further comprising:

a mean value computation portion that computes a mean amplitude value by computing an average of two amplitude values of a signal that is output from the second absolute value circuit, wherein the input data decoding portion determines the first and second bit values by comparing the amplitude values of the signal that is output from the second absolute value circuit to the mean amplitude value that has been computed by the mean value computation portion.

4. The information processing device according to claim 3, further comprising:

a clock signal extraction portion that extracts a clock signal by detecting the polarity inversions in the signal that is received by the signal receiving portion, wherein the first absolute value circuit converts the amplitude values in the signal into absolute values by synchronizing the signal that has been received by the signal receiving portion to the clock signal that has been extracted by the clock signal extraction portion, then multiplying the amplitude values in the signal by the amplitude values in the clock signal, and the second absolute value circuit takes the signal that has been output from the low-pass filter and converts the amplitude values in the signal into absolute values by synchronizing the signal that has been output from the low-pass filter to the clock signal that has been extracted by the clock signal extraction portion, then multiplying the amplitude values in the signal that has been output from the low-pass filter by the amplitude values in the clock signal.

5. The information processing device according to claim 4, wherein the first and the second absolute value circuits are double balanced mixers that convert an input signal into absolute values by using the clock signal that has been extracted by the clock signal extraction portion.

6. A signal processing method, comprising the steps of:

receiving a signal in the form of an eye pattern in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that a same amplitude value does not occur twice in succession and such that polarities of the first amplitude values and the second amplitude values are inverted with each cycle;

converting into absolute values the amplitude values of the received signal; and decoding the input data by determining the first and second bit values based on the amplitude values in the signal that have been converted into absolute values.

7. The information processing device according to claim 1, wherein the first bit value is "1" and the second bit value is "0".

* * * * *